US00RE39287E

(19) United States
(12) Reissued Patent
Bishop, II

(10) Patent Number: US RE39,287 E
(45) Date of Reissued Patent: Sep. 19, 2006

(54) CONTROLLED TEMPERATURE CABINET SYSTEM AND METHOD

(75) Inventor: Robert A. Bishop, II, Plano, TX (US)

(73) Assignee: Medical Products, Inc., Chantilly, VA (US)

(21) Appl. No.: 09/908,488

(22) Filed: Jul. 19, 2001

Related U.S. Patent Documents

Reissue of:
(64) Patent No.: 5,924,289
Issued: Jul. 20, 1999
Appl. No.: 08/886,576
Filed: Jul. 1, 1997

(51) Int. Cl.
*F25B 21/02* (2006.01)

(52) U.S. Cl. ..... 62/3.61; 62/3.7

(58) Field of Classification Search ..... 62/3.61, 62/3.7, 3.2, 3.3, 3.62, 457.9, 239
See application file for complete search history.

(56) References Cited

U.S. PATENT DOCUMENTS 2,741,099 A * 4/1956 Beane
3,241,603 A 3/1966 Nagata
3,255,812 A * 6/1966 Bayane et al.
3,329,202 A 7/1967 Birman
3,353,589 A 11/1967 Tope et al.

(Continued)

OTHER PUBLICATIONS

Palmer et al, "Altered States: The Influence of Temperature on Prehospital Drugs," JEMS, Dec. 1985, pp. 29–31.*

Cahill, "New Name, New Helmsman", JEMS, Aug. 1996, pp. 89–90, 92.*

"CBI Healthcare Systems, Inc.", JEMS, Mar. 1997, p. 80.*

"P–34 PC–3 Precision Control Thermoelectric Cooler/Warmer", Koolatron, Jan. 1998.*

"Canadian company announces the release of a precision control unit", Koolatron Press Release, Aug. 10, 1997.*

"500 miles from nowhere, it'll give you a cold drink or a warm burger". Technology Update.*

"1997 U.S. & Price List Portable Electronic 12 Volt Cooler/Warmers", Koolatron, Jan. 1, 1997.*

Kellow et al, "Drug Adulteration in Prehospital Emergency Medical Services", Oct. 1994.*

* cited by examiner

*Primary Examiner*—William C. Doerrler
(74) *Attorney, Agent, or Firm*—Edell, Shapiro & Finnan

(57) ABSTRACT

A temperature controlled cabinet system and method enables medical items associated with particular temperature ranges to be stored and maintained within the associated temperature ranges in cabinets disposed within ambulances and other medical vehicles. The system includes a temperature sensor for measuring the cabinet interior temperature, a controller assembly for controlling system operation and two head pumps disposed in the cabinet walls to heat or cool the cabinet interior. Alternatively, a single head pump may be utilized to heat or cool the cabinet interior. The controller assembly includes a control console for displaying the actual cabinet temperature and entering a desired temperature range into the system. The heat pumps include a pair of heat sinks disposed about a thermoelectric device (e.g., a Peltier chip) that heats one heat sink, while cooling the other heat sink based on voltage polarity or current flow direction applied to the device. The system controls voltage polarity applied to the thermoelectric device to enable the heat pumps to heat or cool the cabinet interior in response to a comparison of the measured temperature with the desired temperature range. The system utilizes D.C. power from the vehicle electrical system, and may be installed in new cabinets or retrofit into previously disposed cabinets lacking temperature control capability.

71 Claims, 19 Drawing Sheets

U.S. PATENT DOCUMENTS 3,386,498 A 6/1968 Funfstuck
3,536,132 A * 10/1970 Pecoraro et al.
3,612,165 A 10/1971 Haynes
3,713,302 A * 1/1973 Reviel ..... 62/3.6
3,826,305 A 7/1974 Fishman
3,858,106 A * 12/1974 Launius ..... 321/45 R
4,318,276 A * 3/1982 Sato et al. ..... 62/126
4,328,676 A * 5/1982 Reed
4,364,234 A * 12/1982 Reed ..... 62/3.6
4,402,185 A * 9/1983 Perchak ..... 62/3.7
4,407,133 A * 10/1983 Edmonson ..... 62/3.6
4,651,813 A 3/1987 Witt et al.
4,665,707 A * 5/1987 Hamilton ..... 62/3.2
4,726,193 A * 2/1988 Burke et al. ..... 62/3.6
4,823,554 A * 4/1989 Trachtenberg et al. ..... 62/3.61
4,961,320 A * 10/1990 Gutmann ..... 62/3.2
5,025,627 A * 6/1991 Schneider ..... 6/527
5,061,630 A * 10/1991 Knopf et al. ..... 435/290
5,217,064 A * 6/1993 Kellow et al. ..... 165/48.1
5,237,826 A * 8/1993 Baldwin ..... 62/77
5,315,830 A * 5/1994 Doke et al. ..... 652/3.2
5,333,394 A * 8/1994 Herdeman et al. ..... 34/467
5,437,163 A * 8/1995 Jurewicz et al.
5,483,799 A * 1/1996 Dalto ..... 62/3.7
5,572,873 A * 11/1996 Lavigne et al. ..... 62/3.62
5,661,978 A * 9/1997 Holmes et al. ..... 62/3.6
5,746,271 A 5/1998 DeCosta

A

B
TEMP< RANGE MIN
NO
YES
DISABLE COOLING MODE INDICATOR LIGHT AND ENABLE HEATING MODE INDICATOR LIGHT TO FLASH TO INDICATE HEATING MODE
SEND VOLTAGE TO PELTEIR CHIP TO COOL EXTERIOR HEAT SINK AND WARM INTERIOR HEAT SINK
POWER SWITCH OFF?
NO
YES
END

CONTROLLED TEMPERATURE CABINET SYSTEM AND METHOD

Matter enclosed in heavy brackets [ ] appears in the original patent but forms no part of this reissue specification; matter printed in italics indicates the additions made by reissue.

BACKGROUND OF THE INVENTION

1. Technical Field

The present invention pertains to a temperature control system for installation within cabinets to control temperature within those cabinets. In particular, the present invention pertains to a temperature control system for installation within cabinets of ambulances or other medical vehicles to maintain cabinet interiors at appropriate temperatures for storing drugs and/or intravenous (i.e., I.V.) solution.

2. Description of the Prior Art

Ambulances and other medical vehicles typically include cabinets to store medical items, such as drugs or intravenous (I.V.) solution, for use by medical personnel. Generally, drugs and I.V. solution are required to be maintained at specific temperatures. In particular, I.V. solution, typically contained within I.V. bags, needs to be maintained at approximately body temperature in order to avoid thermal shock and injury to a patient. Similarly, certain drugs are required to be maintained at particular temperatures in order to lengthen their active life and/or be safely administered to patients. However, existing cabinets utilized in ambulance and other medical vehicles typically do not provide a temperature controlled environment, but rather merely store medical items. Thus, drugs or I.V. solutions that are initially thermally treated to have temperatures within their appropriate utilization temperature range may quickly attain temperatures outside that range when stored in cabinets lacking temperature control capability, thereby risking injury to the patient.

Although temperature controlled cabinets may exist in other contexts, those cabinets typically require A.C. (i.e., alternating current) voltage to maintain the cabinet interior at a desired temperature and are not suited for use within ambulances or other medical vehicles since only D.C. (i.e., direct current) voltage is available in these vehicles. Further, there is no provision for incorporating temperature control capability into cabinets previously disposed in ambulances and other medical vehicles. Thus, there exists a need in the art for a temperature control system for installation within ambulance and other medical vehicle cabinets to maintain medical items, such as drugs and I.V. solution, at appropriate temperatures to avoid injury when the medical items are administered to a patient. In addition, there exists a need in the art for the temperature control system to utilize D.C. voltage in order to be compatible with vehicle electrical systems.

OBJECTS AND SUMMARY OF THE INVENTION

Accordingly, it is an object of the present invention to control temperature within ambulance or other medical vehicle cabinets to maintain medical items (i.e., drugs, I.V. solution) at their appropriate temperatures.

It is another object of the present invention to retrofit ambulance or other medical vehicle cabinets with temperature control capability to maintain medical items at their prescribed temperature.

Yet another object of the present invention is to employ a temperature control system within vehicle cabinets and utilize voltage supplied by that vehicle to power the temperature control system.

The aforesaid objects are achieved individually and in combination, and it is not intended that the present invention be construed as requiring two or more of the objects to be combined unless expressly required by the claims attached hereto.

According to the present invention, a temperature control system for maintaining a cabinet or other storage structure interior at a desired temperature includes two heat pumps disposed within a cabinet wall, a controller assembly for providing a user interface and controlling system operation and a temperature sensor for measuring cabinet interior temperature. The heat pumps heat or cool the cabinet interior to maintain the cabinet interior at the desired temperature. Alternatively, a single larger heat pump may be utilized to heat or cool the cabinet interior. The system is preferably directed toward cabinets disposed in ambulances and other medical vehicles in order to maintain medical items, such as drugs or intravenous solution, contained within the cabinet at their appropriate temperature (i.e., 21° C. –26° C. for drugs, 35° C.–40° C. for I.V. solution). The system may be installed by ambulance or other medical vehicle manufacturers in cabinets within new vehicles as an option or on remounts. Further, the system may be retrofit into an existing cabinet within an ambulance by any ambulance or medical emergency vehicle user. The system may utilize D.C. voltage supplied by the vehicle electrical system and with the use of a vehicle converter, the vehicle battery may be protected while the vehicle is connected to stationary power outlets. The system may convert an insulated cabinet having a maximum approximate volume of 6,000 cubic inches to a temperature controlled cabinet.

The heat pumps typically include a pair of heat sinks surrounding a solid state thermoelectric device ;(i.e., a Peltier chip). The heat sinks are typically constructed of thermally conductive material and include fins to enable air to circulate and transfer thermal energy from the heat sinks to the surrounding environment. Further, fans are disposed adjacent each heat sink to circulate air and enhance heat pump efficiency. The thermoelectric device causes one heat sink to absorb thermal energy (i.e., thereby cooling the surrounding environment), while enabling the other heat sink to expel thermal energy (i.e., heat the surrounding environment) based on the direction of current or voltage polarity directed to the device. Since the heat pumps utilize a solid state thermoelectric device, the heat pumps have no moving parts, except for the fans, and are extremely reliable. The heat pumps are installed in the cabinet such that one heat sink is typically disposed exteriorly of the cabinet while the other heat sink is disposed within the cabinet interior.

The controller assembly includes a control console having a display and other user interface devices, such as a power switch and buttons for entering information into the system, and a programmable digital controller and associated circuit board containing switching circuitry that, in combination, transmit control signals to the heat pumps via a wye and wiring harness (i.e., a wye harness is utilized with a wiring harness when connecting two heat pumps to the controller assembly, while only the wiring harness is utilized when connecting a single heat pump to the controller assembly) based on the cabinet interior temperature measured by the temperature sensor. The wiring harness may vary in length such that the controller assembly may be installed separate from the cabinet within an ambulance action wall (i.e., ambulance wall containing switches, controls and equipment) or other appropriate location within the ambulance or other medical vehicle. In response to a temperature signal from the temperature sensor, the controller directs voltages, via the switching circuitry, to the thermoelectric device to heat or cool the cabinet interior in order to maintain the desired temperature. A desired cabinet interior temperature may be entered into the system via buttons disposed on the control console display. The solid state digital controller permits preferred temperatures to be programmed and maintained, even though the ambient temperature in the ambulance or other medical vehicle may be either above or below the programmed temperature.

It is to be understood that the present invention includes several features and advantages, some of which include: solid state thermoelectric heat pumps that heat or cool a cabinet interior; a programmable digital controller with preferred temperature setting (i.e., lock in) capability; heat pumps having no moving parts, except for fans, thereby providing inherent reliability; temperature sensor input from an RTD thermocouple; maintaining a constant desired temperature within a cabinet for storage of medical items at their prescribed temperature; system operation powered by 12 V DC supplied from the ambulance or other medical vehicle; cools or warms drugs to manufacturers recommended storage temperatures; and warms I.V. solutions to temperatures of 35° C.–40° C. (i.e. body temperature.

The above and still further objects, feature and advantages of the present invention will become apparent upon consideration of the following detailed description of a specific embodiment thereof, particularly when taken in conjunction with the accompanying drawings wherein like reference numerals in the various figures are utilized to designate like components.

DESCRIPTION OF THE PREFERRED EMBODIMENTS

Figure 1:
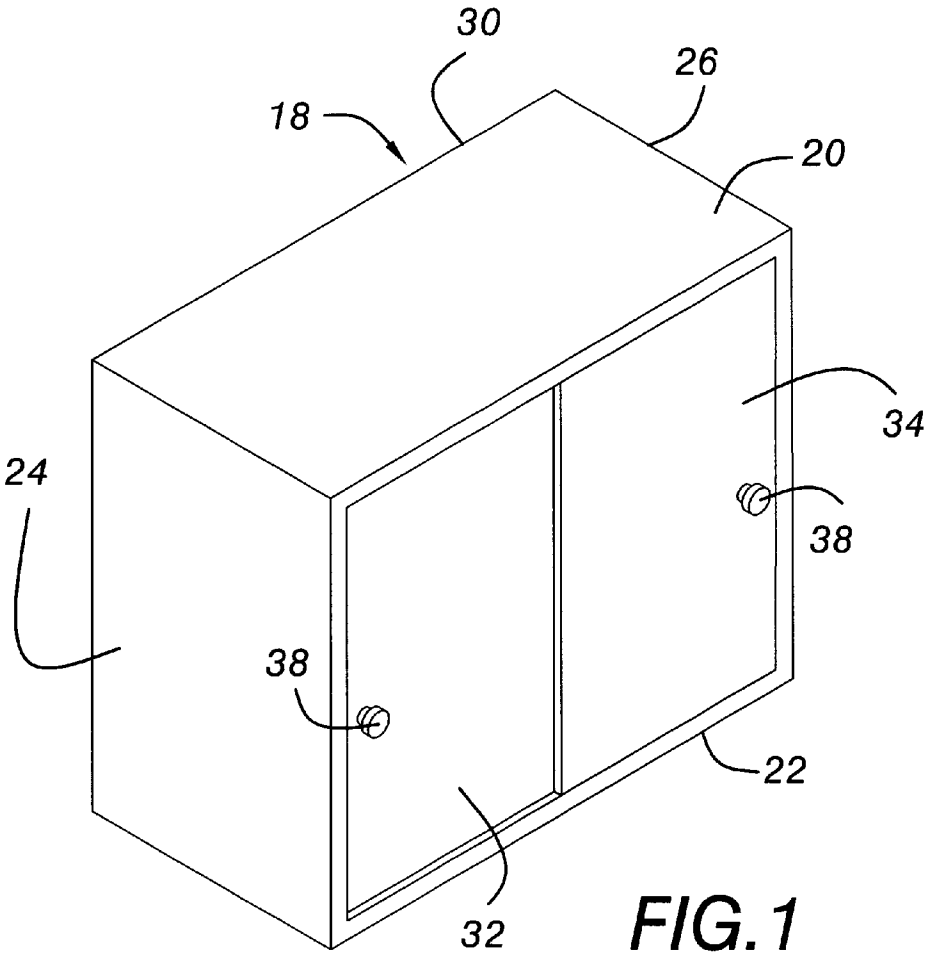
FIG. 1 is a view in perspective of an exemplary cabinet employed by the present invention.

An exemplary cabinet of the type employed by the present invention for use in ambulance or other medical vehicles to contain medical items (e.g., drugs or intravenous solution contained with I.V. bags) is illustrated in FIG. 1. Specifically, cabinet 18, typically disposed along with a plurality of other cabinets within an ambulance or other medical vehicle interior, is similar in shape to a substantially rectangular box and includes top and bottom walls 20, 22 side walls 24, 26 and rear wall 30. The cabinet front typically includes doors 32, 34, preferably disposed between top and bottom walls 20, 22 and side walls 24, 26. Each wall is substantially rectangular wherein top and bottom walls 20, 22 include substantially similar dimensions, while side walls 24, 26 also include substantially similar dimensions. Rear wall 30 is disposed between top and bottom walls 20, 22 and side walls 24, 26 such that the cabinet walls and doors collectively define a cabinet interior. It is to be understood that the terms "front", "rear", "top", "bottom", "side", "lower" and "upper" are used herein only to indicate points of reference and do not limit the cabinet or present invention to a specific configuration or orientation. Doors 32, 34 are typically disposed at the front of the cabinet to enable placement and removal of medical items, such as drugs or intravenous solution bags, from the cabinet interior. By way of example only, cabinet 18 includes two substantially rectangular sliding doors 32, 34, however, the cabinet may include any quantity or type of doors that open and close in any manner or direction. Further, the cabinet doors may be of any shape, while the cabinet interior may include shelves to contain the medical items.

Doors 32, 34 are each typically substantially rectangular having substantially similar dimension wherein the height of each door is slightly less than the distance between top wall 20 and bottom wall 22, while the width of each door is approximately one-half the width of the cabinet. Doors 32, 34 are typically disposed one in front of the other to permit the doors to slide between the cabinet side walls and enable access to the cabinet interior. By way of example only, door 34 is disposed in front of door 32 such that door 32 is slightly recessed toward the cabinet interior, while door 34 is substantially flush with the top, bottom and side wall edges. However, the doors may be disposed on the cabinet in any manner capable of permitting the doors to slide between the side walls. Alternatively, doors 32, 34 may be attached to cabinet 18 via hinges such that the doors may pivot to an open or closed position. Doors 32, 34 are typically secured to cabinet 18 via rails or tracks (not shown) disposed on the interior surface of top wall 20 and/or bottom wall 22 wherein the doors engage the tracks to slide between the cabinet side walls. Doors 32, 34 each include a know or handle 38 disposed toward the middle portion of each door 32, 34 adjacent a vertical door edge closest to respective cabinet side walls 24, 26. Knobs 38 may be any conventional knobs, handles or recesses within the doors and may be disposed anywhere on the doors in any fashion. For example, knobs 38 may be implemented by a handle having a substantially circular gripping portion attached to an elongated stem (e.g., as illustrated in FIG. 1) that provides sufficient distance between the gripping portion and the cabinet to enable an operator hand to manipulate the door.

The cabinet described above in relation to FIG. 1 stores medical items within the cabinet wherein the cabinet interior temperature is controlled only by the surrounding environment. However, a temperature control system for maintaining the cabinet interior at a spaced temperature in order to accommodate medical items requiring certain storage temperature ranges is illustrated diagrammatically in FIG. 2. Specifically, a temperature control system 40 includes a controller assembly 42, a temperature sensor 44 interfacing a sensor plug type connector 37, a wiring harness 49 including receptacle type connections 46 and 47, a wye harness 48 including plug type connector 50 and receptacle type connectors 52 and heat pumps 54. Heat pumps 54 are typically installed within cabinet side walls as described below to heat and/or cool the cabinet interior based on control signals generated by controller assembly 42. Heat pumps 54 are each connected to a respective connector 52 of wye harness 48 via a plug type connector 98 wherein connectors 52 are connected to receptacle 47 of wiring harness 49, via connector 50, to receive signals from controller assembly 42. Receptacles 47 of wiring harness 49 is connected to controller assembly 42 and conveys control signals to receptacle connectors 52, via plug connector 50, to control heat pumps 54. Temperature sensor 44, typically an RTD thermocouple, is disposed within the cabinet interior to measure cabinet temperature and to send a converted signal representing the temperature to the controller assembly. Temperature sensor 44 is connected to receptacle connector 46 of wiring harness 49 via plug connector 37 wherein the wiring harness interfaces the controller assembly to convey the temperature signals representing the cabinet interior temperature to the controller assembly.

Controller assembly 42 includes a control console described below having switches and a display for entering a desired temperature and displaying the current temperature of the cabinet interior. The controller assembly generates signals in a manner described below to control heat pumps 54 in response to a particular reading from sensor 44. In other words, when the cabinet interior temperature exceeds a desired temperature, controller assembly 42 directs heat pumps 54 to cool the interior, while directing heat pumps 54 to heat the cabinet interior when the cabinet interior temperature is less than a desired temperature. Wires connecting controller assembly 42 and heat pumps 54 to wye and wiring harnesses 48, 49 are color coded to ensure proper connections. Temperature control system 40 may be incorporated into a new cabinets during manufacture, or may be retrofit into cabinets lacking temperature control capability to form a temperature controlled cabinet.

Figure 2:
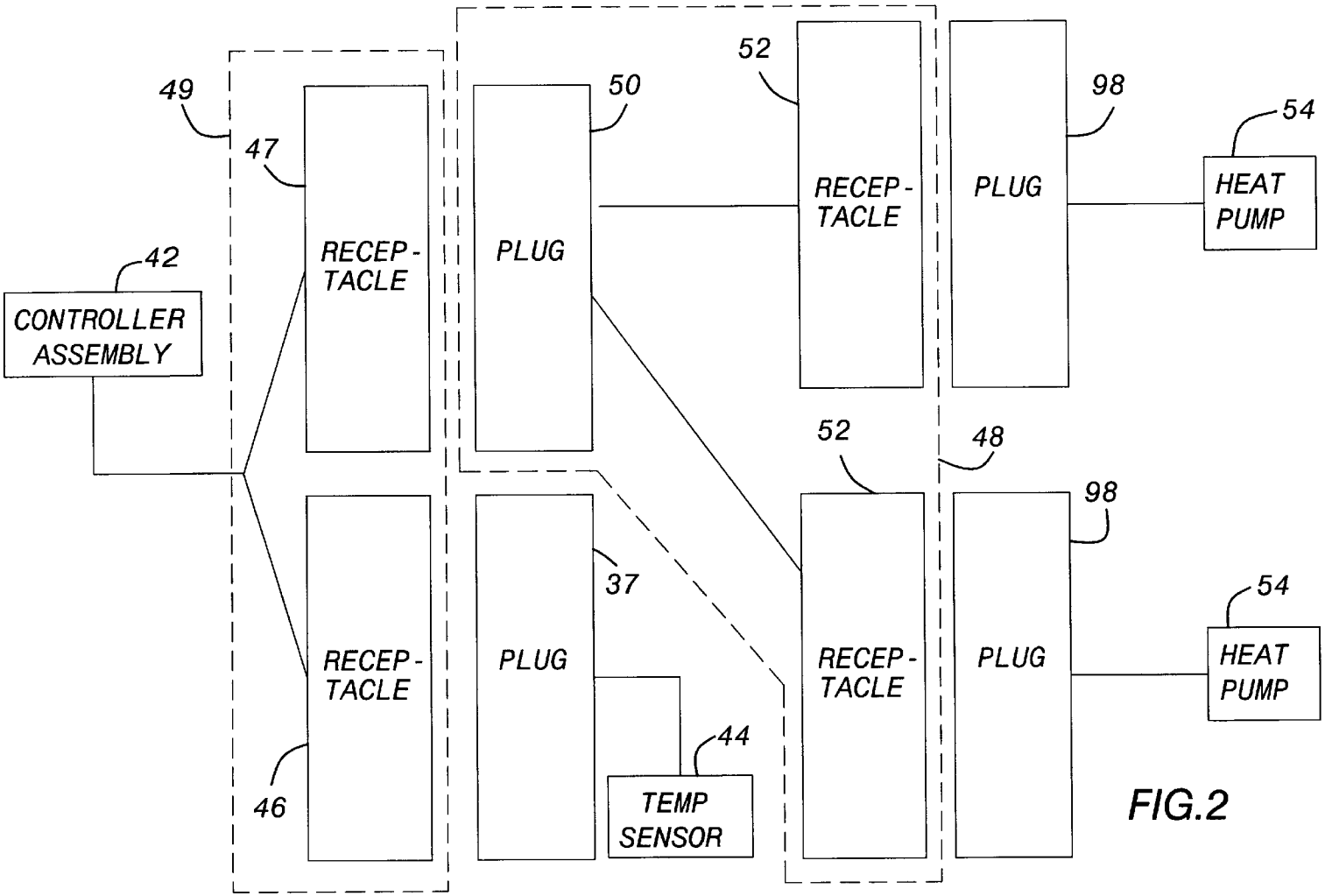
FIG. 2 is a block diagram of a temperature control system for an ambulance or other medical vehicle cabinet according to the present invention.
Figure 3:
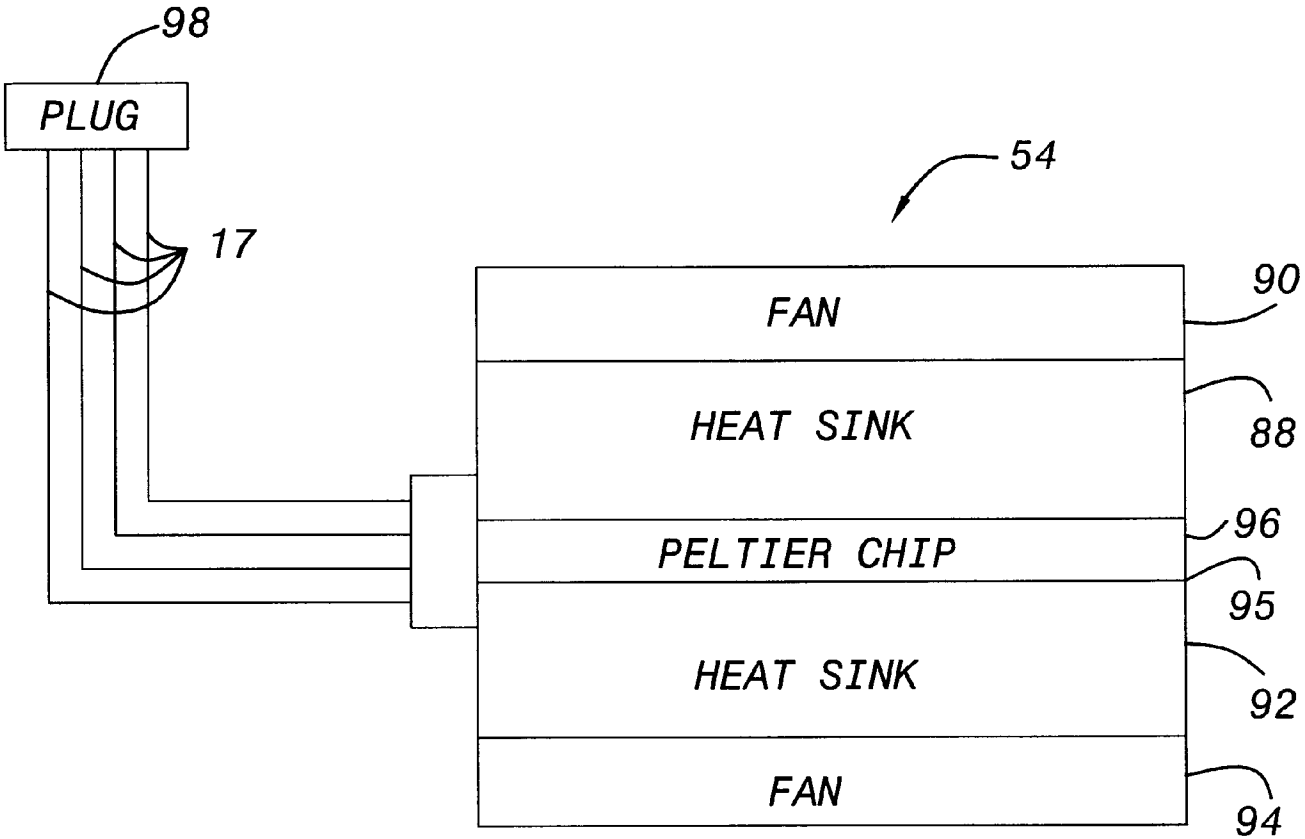
FIG. 3 is a bloc diagram of a temperature control system heat pump according to the present invention.

The configuration of each heat pump 54 is illustrated in FIG. 3. Specifically, heat pumps 54, preferably implemented by a model ST 3457 manufactured by Marlow Industries, Inc. of Dalls, Tex. modified structurally to accommodate the present invention, includes an exterior heat sink 88 with corresponding axial face 90, an interior heat sink 92 with corresponding axial fan 94, and an insulating layer 95 and Peltier chip 96 (i.e., thermoelectric device) disposed between the exterior and interior heat sinks. Exterior heat sink 88 typically has larger dimensions than interior heat sink 92. Power and other signals for fans 90, 92 and Peltier chip 96 are received via wires 17. Wires 17 are color coded and connected to plug type connector 98, typically having four pins for connection to wye harness 48 (FIG. 2). Heat pumps 54 are inserted into a cabinet wall with insulation 95 and Peltier chip 96 substantially coincident the wall, exterior heat sink 88 disposed exterior of the cabinet, and interior heat sink 92 disposed within the cabinet interior as described below.

Figure 5:
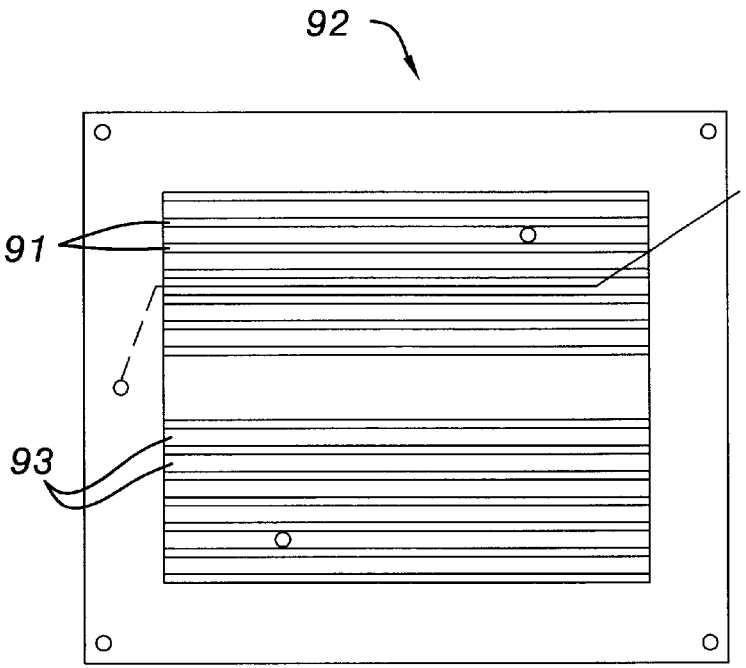
FIG. 5 is a top view of an interior heat sink employed within the heat pump of FIG. 3 according to the present invention.
Figure 4:
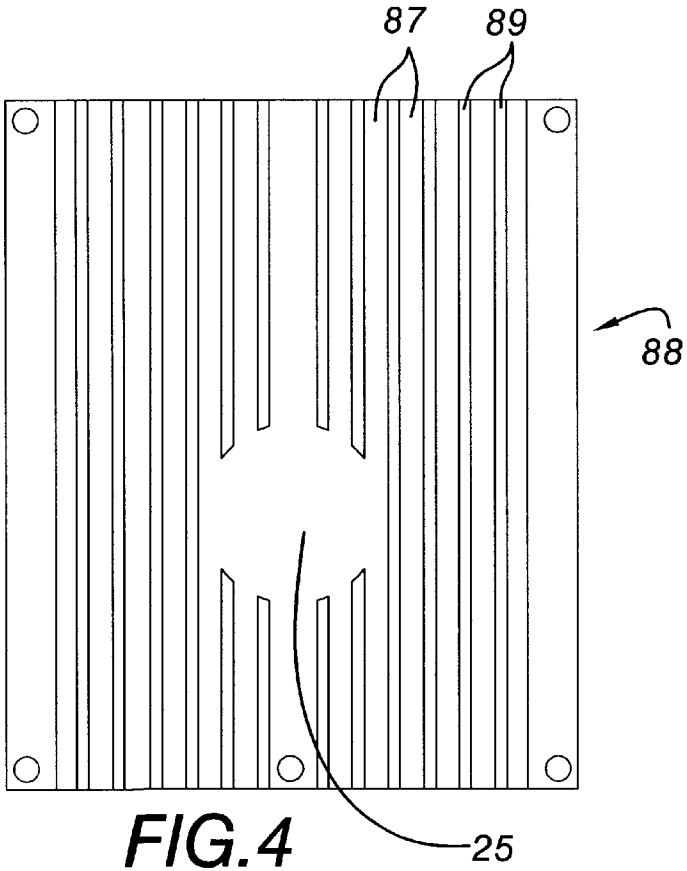
FIG. 4 is a top view of an exterior heat sink employed within the heat pump of FIG. 3 according to the present invention.

Heat sinks 88, 92 for transferring thermal energy to the surrounding environment are illustrated in FIGS. 4–5. Specifically, heat sinks 88 and 92 are substantially rectangular and are typically constructed of a thermally conductive material (e.g., metal). Exterior heat sink 88 (FIG. 4) includes a plurality of fins 89 extending along longitudinal axes of that heat sink. Fins 89 typically include a substantially rectangular transverse cross-section and extend from a top surface of exterior heat sink 88 substantially in parallel with each other. Fins 89 are separated by a substantially similar distance except that the distance between the two innermost fins (i.e., the fins closest to and disposed on opposite sides of the heat sink center) is slightly larger than the distances between the remaining fins. The heights of fins 89 are substantially similar except that the outermost fins (i.e., the fins farthest from the heat sink center and closest to the exterior heat sink edges) have a height slightly smaller than the height of the remaining fins. Channels 87 are defined between successive fins 89 such that air may traverse the channels to be heated or cooled by the exterior heat sink. An opening 25 is defined at the approximate center of exterior heat sink 88 for enabling a fan motor to be inserted for circulating air through channels 87 to enhance heat pump efficiency. Similarly, interior heat sink 92 (FIG. 5 includes a plurality of fins 91 extending along longitudinal axes of that heat sink. Fins 91 typically includes a substantially rectangular transverse cross-section and extend from a top surface of interior heat sink 92 substantially in parallel with each other. Fins 91 are separated by a substantially similar distance except that the distance between the innermost fins (i.e., the fins that are closest to and disposed on opposite sides of the heat sink center) is slightly larger than the distances between the remaining fins. The heights of fins 91 are substantially similar except that a portion of the fins have heights slightly smaller than heights of the remaining fins to accommodate wiring. Channels 93 are defined between successive fins such that air may traverse the channels to be heated or cooled by the interior heat sink.

Figure 6:
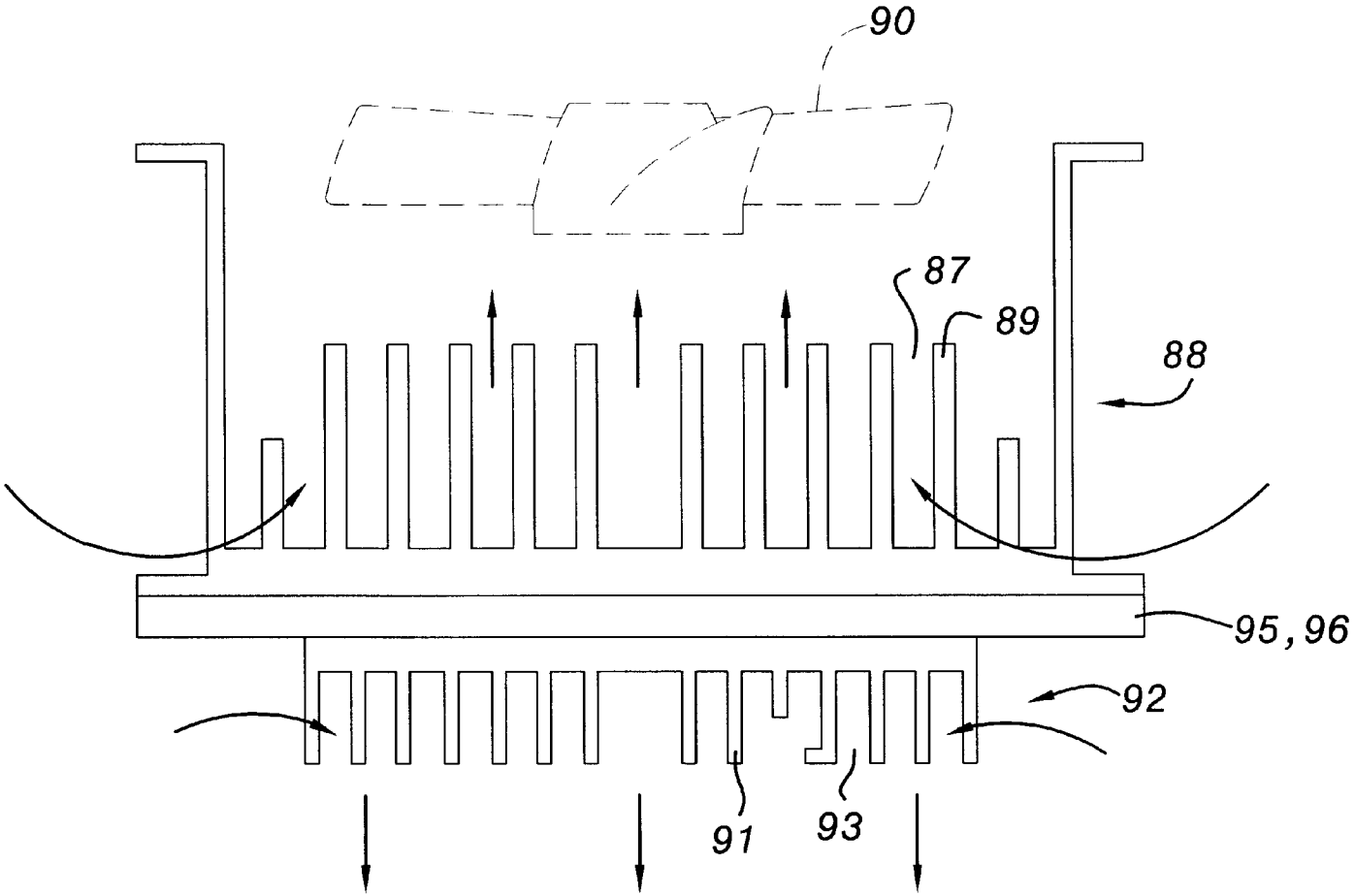
FIG. 6 is a side view in elevation and partial section of a temperature control system heat pump diagrammatically illustrating air flow within the heat pump according to the present invention.

Fans 90 and 94 (FIG. 3) enhance hat pump efficiency by circulating air through channels 87, 93 and back to the surrounding environment as illustrated in FIG. 6. Specifically, air within the cabinet interior traverses channels 93 of interior heat sink 92 and returns to the cabinet interior via fan 94 (i.e., in accordance with the arrows shown in FIG. 6). The circulating air transfers thermal energy from the interior heat sink to the cabinet interior to heat or cool the cabinet interior and maintain a desired temperature. The air circulation for exterior heat sink 88 is substantially similar (i.e., as shown by the arrows in FIG. 6). Exterior and interior heat sinks 88, 92 may be connected to Peltier chip 96 in any orientation such that fins 89 and 91 may be parallel or orthogonal to each other to achieve maximal air circulation and increased heat pump efficiency.

Heat pumps 54 utilize Peltier chip 96 (i.e., a solid state thermoelectric device) to heat and cool heat sinks 88 and 92. This type of thermoelectric device typically includes an array of thermocouples that operate in accordance with the Peltier effect. Basically, the thermoelectric device obeys the laws of the therodynamics in a similar manner as mechanical heat pumps, refrigerators or other devices used to transfer heat energy, except that this device includes solid state electrical components instead of mechanical/fluid heating and cooling components. Specifically, when D.C. (i.e. direct current) electrical power is applied to a thermoelectric device having an array of thermocouples, head is absorbed on a cold side of the thermocouples wherein the heat passes through the thermocouples to be dissipated on the hot side of the thermocouples. Heat sinks are typically disposed on the hot and cold sides of the thermocouples to respectively aid in the dissipating heat to, or removing heat from, the adjacent environment. Whether the heat sinks absorb or dissipate heat is determined by the direction of current flow through, or voltage polarity applied to, the device in accordance with the Peltier effect.

Peltier chip 96 enables heat sinks 88 and 92 to dissipate and absorb heat based on the voltage polarity applied to that chip. An particular, the Peltier effect stipulates that when current passes across a junction between two different metals, heat is either absorbed or dissipated based on current flow in relation to junction voltage direction. Current opposing the voltage direction causes heating of the junction, wile current flowing with the voltage causes junction cooling. For example, an electric current driven in a bimetallic circuit maintained at uniform temperature causes heat to be dissipated at one circuit junction and absorbed at the other junction. This phenomenon occurs since an isothermal electric current in a metal is accompanied by a thermal current. Since the electric current is uniform and the thermal currents vary between metals, the difference in thermal currents is dissipated at one junction and absorbed at the other junction to maintain uniform temperature. In other words, it is necessary to supply heat at one junction and extract heat at the other junction to maintain uniform temperature in a bimetallic circuit. Peltier chip 96 functions in a similar manner to dissipate heat to interior heat sink 92, while absorbing heat (i.e., cooling) from exterior heat sink 88 based on the direction of current flow or voltage polarity received by the chip. When the current flow or voltage polarity is reversed, the interior heat sink 92 absorbs heat, while exterior heat sink 88 dissipates heat. For further details on thermoelectric devices and their operation, reference is made to U.S. Pat. No. 5,315,830, incorporated herein by reference in its entirety.

Figure 7:
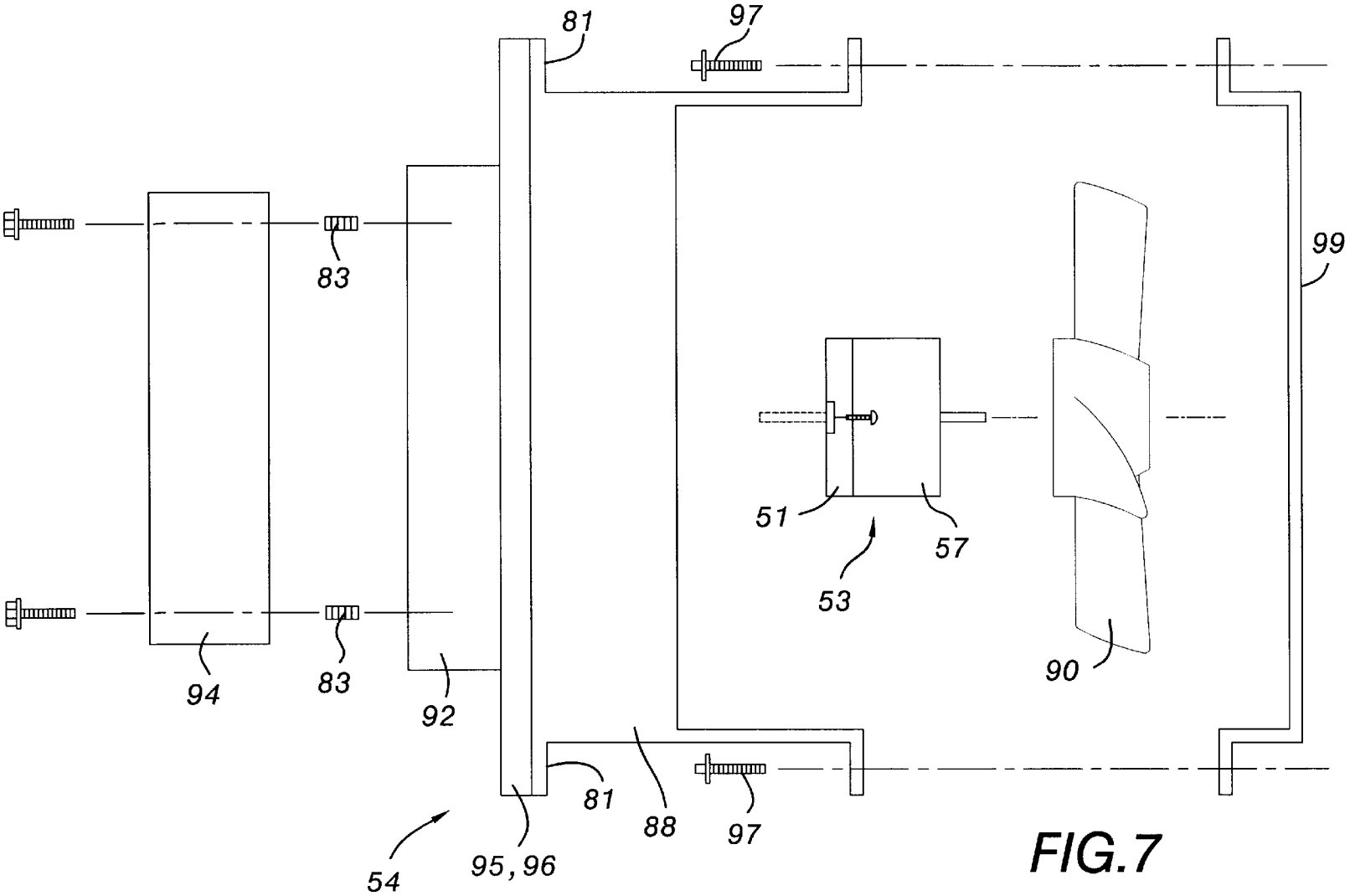
FIG. 7 is an exploded side view in elevation of the heat pump of FIG. 3 according to the present invention.

Preparation of heat pumps 54 for installation within a cabinet side or other wall is illustrated in FIG. 7. This is typically accomplished by modifying assembled heat pumps, such a msodel ST 3457 manufactured by Marlow Industries, Inc. of Dallas, Tex. Specifically, heat pumps 54 are prepared for installation by initially removing a fan motor 53 having a rotor 57 and stator 51, wherein a corresponding shaft extends from the rotor and stator. The shaft connected to motor stator 51 (i.e., shown in phantom in FIG. 7) is removed via an abrasive wheel (e.g., a saw or other device). Two recesses are formed into interior heat sink 92, while a hole is defined in exterior heat sink 88 coincident a location where wires from Peltier chip 96 may exit heat pump 54 for wire routing. A plurality of holes are defined within projections extending from the edges of exterior heat sink 88 to accept rivets 97 for attaching a fan guard 99 to that heat sink. Additional holes are placed in flanges 81 transversely extending from exterior heat sink 88 adjacent insulation 95 and Peltier chip 96 for mounting heat pump 54 to the cabinet wall. Threaded inserts 83 are disposed in the recesses formed in interior heat sink 92 such that fan 94, preferably a three inch axial fan, is attached to that heat sink via screws interfacing the threaded inserts. Fan motor 53 is reinstalled adjacent exterior heat sink 88, while motor wires are disposed through the wire routing hole described above. Wires from fan 94 are routed between fins 91 (FIG. 6) of interior heat sink 92 through insulation 95 to a location where remaining wires (i.e., the wires from the fan motor and Peltier chip) are routed. Wires from fans 94 and fan motor 53 are cut to approximately two inches and stripped to approximately one-half inch, polarized (i.e., red fan motor line paired to a lettered electronic or axial fan line and connected to an approximate ten inch, red fourteen gauge lead, and black fan motor line paired to a non-lettered electronic or axial fan line and connected to an approximate ten inch, black fourteen gauge lead), joined in their respective pairs and soldered using a butt technique. Wires from Peltier chip 96 are cut to approximately two inches and stripped to approximately one-half inch, polarized (i.e., black lead of the Peltier chip connected to an approximate ten inch, yellow fourteen gauge lead, while the white lead of the Peltier chip is connected to an approximate ten inch, blue fourteen gauge lead), joined and soldered using a butt technique. The soldered wire sections described above are protected using heat shrink tubing, preferably having approximate dimensions of one-eighth inch by two inches. All wires are collected and routed through insulation 95 to reside adjacent interior heat sink 92. The soldered and protected section is further bounded by heat shrink tubing, preferably having approximate dimensions of three-eighths inches by four inches, and is disposed proximate the heat pump. The four color coded wires described above, (i.e., red, black, blue, and yellow) are stripped approximately one-quarter of an inch wherein a corresponding metal pin, preferably male, is crimped and soldered to an end of each wire. The metal pins are inserted into a four position male plug 98 (FIG. 3).

Figure 8:
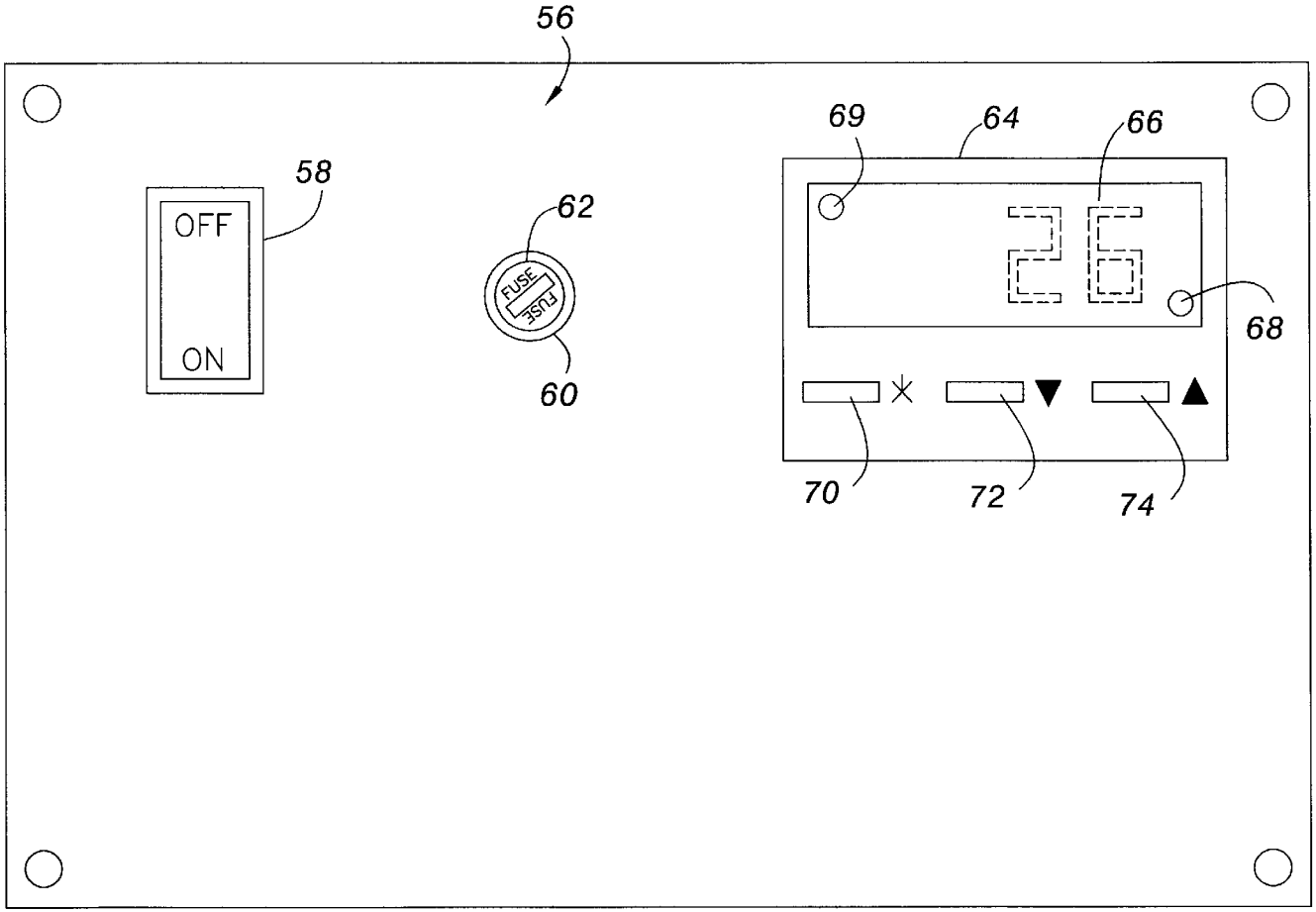
FIG. 8 is a front view in plant view of a temperature control system control console according to the present invention.

Controller assembly 42 controls system operation and includes a faceplate or control console 56 as illustrated in FIG. 8. Specifically, control console 56 is substantially rectangular and includes a power (i.e., ON/OFF) switch 58, fuse holder 60, preferably including a fifteen amp fuse 62, and a controller display 64. Fuse holder 60 is generally disposed between power switch 58 and display 64 toward an upper portion of control console 56, however, the control console may be of any shape with the power switch, fuse holder and display arranged on the control console in any fashion. Power switch 58 may be implemented by any conventional power switch, and by way of example only, is implemented by a substantially rectangular switch wherein depressing an end of the switch associated with "ON" or "OFF" attains the desired power distribution to the system. Fuse holder 60 may be implemented by any conventional fuse holder and is preferably implemented by a panel mount fuse holder typically suited to contain a fifteen amp fuse.

Display 64 is associated with a controller described below and includes a light emitting diode (LED) or liquid crystal (LCD) display 66 for displaying the temperature of the cabinet interior. Display 64 is generally configured to display four digits, however, the display may be implemented to display any number of digits.

Display 64 further includes cooling mode and heating mode indicator lights 68, 69, preferably green, disposed diagonally opposite each other to indicate when the interior cabinet temperature has shifted out of a desired temperature range. In particular, cooling mode indicator light 68 is disposed toward the bottom portion of display 66 and indicates a cabinet interior temperature above the desired temperature range, while heating mode indicator light 69 is disposed toward the top portion of display 66 and indicates a cabinet interior temperature below the desired temperature range. User interface buttons 70, 72 and 74 are disposed below display 66 and enable programming of the controller and entry of a desired cabinet temperature. Buttons 70, 72 and 74 are labeled with various indicia (e.g., a star, down arrow and up arrow) to distinguish the buttons and indicate button functions. Generally, button 70 labeled with a star is used for selection, while buttons 72 and 74 are used for manipulating data to be entered. The buttons may be arranged in any manner on display 64 and may include any indicia uniquely identifying each button. Control console 56 is typically red having approximate dimensions of seven inches by five inches. The control console is typically constructed of metal, however, the control panel may have other dimensions, may be constructed of other sufficiently sturdy material and may of any color.

Figure 9:
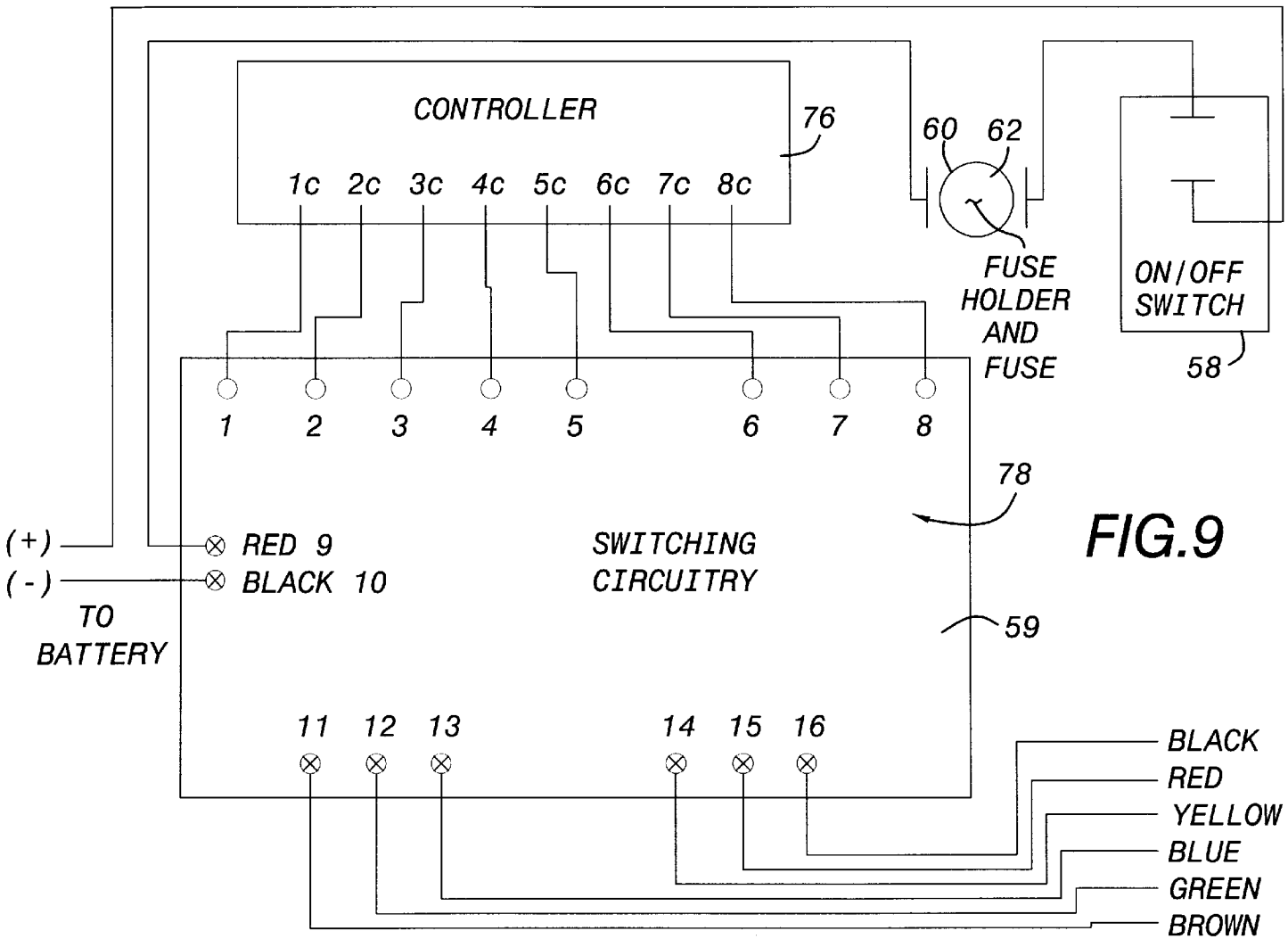
FIG. 9 is a schematic block diagram of controller assembly circuitry for controlling a temperature control system according to the present invention.

The underlying circuitry of controller assembly 42 is illustrated in FIG. 9. Specifically, the controller assembly circuitry is mounted on the back of control console 56 and includes power switch 58 and fuse holder 60 with fuse 62 as described above, a programmable controller 76 and switching circuitry 78 disposed on a circuit board 59. Power switch 58 is connected to a 12 V 15A power lead from a battery (not shown), and controls distribution of power through fuse 62 to circuit board 59. The negative terminal of the battery is also connected to circuit board 59 as described below. Controller 76 is typically implemented by a Cal3200 12 V DC programmable controller. The controller typically includes a plurality of circuit board mounted screw terminals 1c–8c for distributing and receiving signals from switching circuitry 78, however, any other mechanisms may be utilized for distributing and receiving signals. In particular, terminals 1c and 2c receive signals, via circuit board 59, from temperature sensor 44 (FIG. 2) for processing, while terminals 3c and 4c distribute 5 V DC power signals to switching circuitry 78 to control heat pumps 54 (FIG. 2) to perform a cooling operation. Terminal 5c distributes a 12 V DC power signal to switching circuitry 78 to control heat pumps 54 to perform a heating operation, while terminals 6c, 7c and 8c are power inputs for receiving power signals from the battery via circuit board 59. Terminals 6c receives 12 V DC power signals in order to direct power to terminal 5c for controlling heating of the cabinet interior as described above, while terminals 7c and 8c respectively receive 12 V DC and −12 V DC power signals for distributing power to the controller.

Switching circuitry 78 is preferably disposed on circuit board 59 having a plurality of solder terminals 1–8 and screw terminals 9–16, however, the solder and screw terminals may be implemented and arranged in any fashion to receive and distribute signals. Generally, solder terminals 1–8 are disposed toward the upper portion of the circuit board to respectively connect to terminals 1c–8c of controller 76. Terminals 9 and 10 form a two terminal block that is color coded for proper hook-up. Terminals 9 and 10 are typically disposed at an intermediate portion of the circuit board, one above the other adjacent and below terminal 1 toward a circuit board side, and face the back of the controller assembly. Terminal 9 is typically coded red and is connected via fuse 60 to power switch 58, while terminal 10, typically coded black, is connected to the negative terminal of a battery (not shown) or ground. Two three terminal blocks respectively including terminals 11–13 and 14–16 are disposed toward the bottom portion of the circuit board. The terminals are color coded wherein terminals 11–16 are coded brown, green, blue, yellow, red and black, respectively. Receptacle 47 of wiring harness 49 (FIG. 2) connects terminals 13-16 to heat pumps 54 via wye harness 48 according to the color code. Briefly, terminals 11 and 12 are connected to temperature sensor 44 and receive temperature sensor signals. Terminals 13 and 14 distribute control signals to heat pumps 54 to control heating and coding operation, while terminals 15 and 16 distribute power signals to heat pump fans for air circulation as described above.

Figure 10:
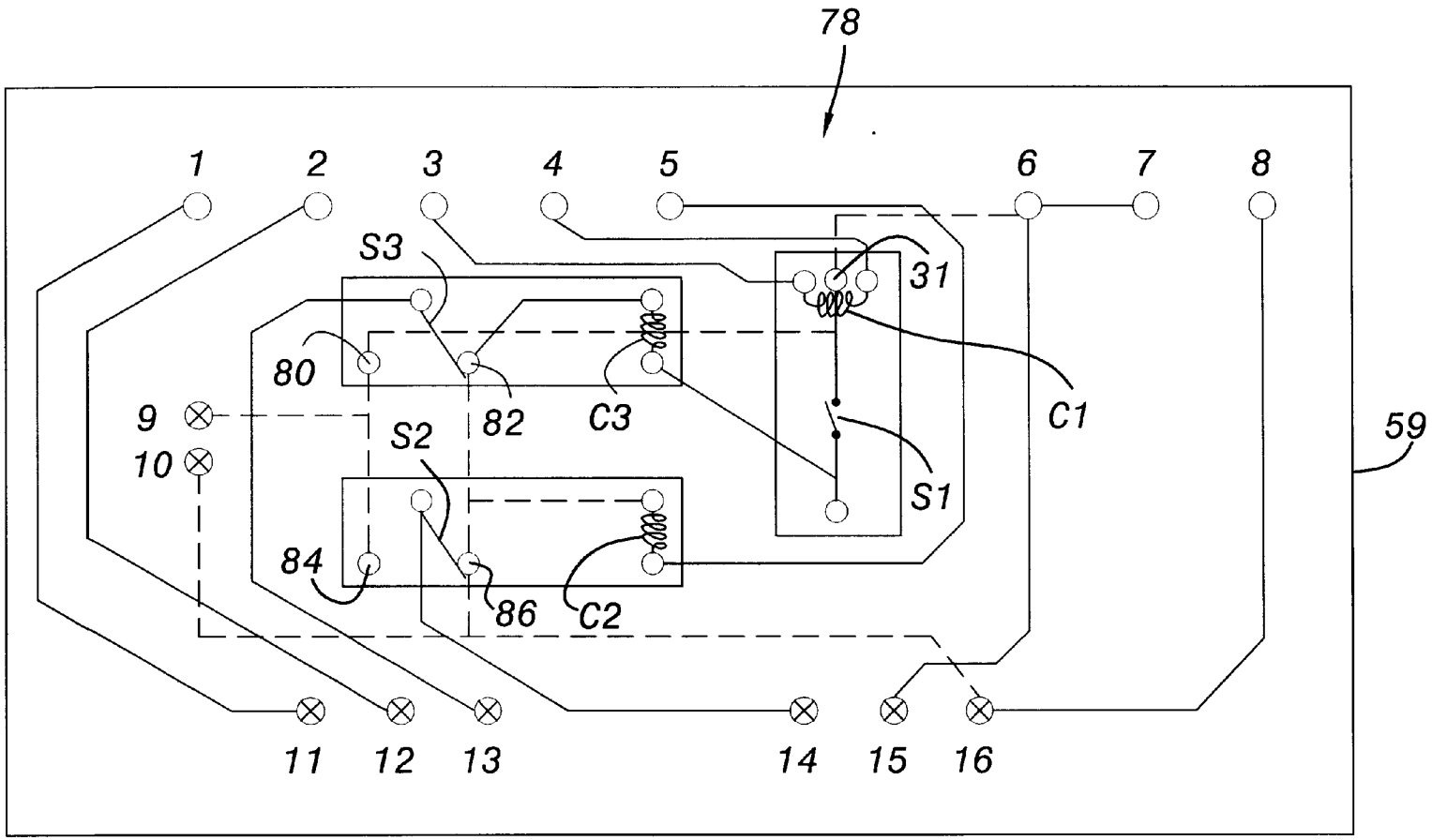
FIG. 10 is an electrical schematic diagram of switching circuitry employed within the controller assembly circuitry of FIG. 9 according to the present invention.

Switching circuitry 78 for controlling heat pumps 54 in accordance with controller 76 is illustrated in FIG. 10. Specifically, circuit board 59 containing circuitry 78 includes terminals 1–16 described above. Terminal 9 is connected to a 12 V DC power lead of a battery (not shown), while terminal 10 is connected to the negative battery terminal as described above. Terminals 11 and 12 are connected to temperature sensor 44, and are connected to terminals 1 and 2 to convey temperature sensor signals to controller 76 (FIG. 9) to process these signals in order to derive proper control signals for heat pumps 54 (FIG. 2). Terminal 6 is connected to terminal 9 and supplies a 12 V DC power signal from terminal 9 to controller 76 and terminal 15 to respectively enable the heat pumps to heat the cabinet and to power heat pump fans as described above. Terminal 7 is connected to terminal 6 and receives the 12 V DC power signal for providing power to controller 76 as described above. Terminal 16 is connected to terminal 10 receiving a −12 V DC power signal that is supplied to terminal 8 for providing power to the controller as described above. This arrangement enables terminals 6–8 to supply power signals to controller 76, while enabling terminals 15–16 to supply power to heat pump fans to enhance heat pump efficiency.

Terminals 3–5 and 13–14are utilized to distribute signals that control operation of heat pumps 54. Briefly, heat pumps 54 include a pair of heat sinks wherein one heat sink is cooled, while the other is heated as described above. The particular heat sink cooled and/or heated is dependent upon the polarity of voltage (i.e., direction of current flow) received by the heat pump as described above. Terminals 13 and 14 are manipulated by switching circuitry 78 such that one terminal supplies a 12 V DC power signal, while the other terminal supplies a −12 V DC power signal to the heat pumps, thereby controlling voltage polarity or current flow. During normal operation, terminals 13 and 14 each include a −12 V DC power signal, thereby inhibiting heat pump operation. In other words, switching circuitry 78 basically provides a 12 V DC power signal on either terminal 13 or 14 to control heat pump operation depending upon the interior cabinet temperature and control signals received from controller 76. Switches S1, S2 and S3, controlled by relays C1, C2, C3, place appropriate voltages on terminals 13 and 14 in response to control signals received from controller 76 to control heat pumps 54.

Accordingly, terminals 3 and 4 are utilized to enable heat pumps 54 to cool the cabinet interior. These terminals receive a 5 V DC power signal from terminals 3c and 4c (FIG. 9) of controller 76 in response to the cabinet interior temperature exceeding the desired temperature range. Terminals 3 and 4 are connected to relay C1, preferably a 5 V DC reed relay. Relay C1 manipulates a corresponding switch S1, normally biased to an open position, wherein a second relay C3, preferably a 12 V DC relay controlling switch S3, is connected in series with switch S1. When terminals 3 and 4 each contain a 5 V DC power signal, relay C1 closes switch S1, thereby energizing relay C3. Relay C3 is energized with 12 V DC provided by contact 31 when switch S1 is actuated wherein contact 31 is connected in series with switch S1 and to terminal 9 supplying a 12 V DC power signal from the battery. Switch S3 is connected to terminal 13 and is manipulated to provide either a 12 V DC or −12 V DC power signal on terminals 13. Switch S3 switches between contacts 80 and 82 and is normally set to contact 82 wherein contact 80 is connected to terminal 9 supplying a 12 V DC power signal from the battery, while contact 82 is connected to terminal 10 supplying a −12 V DC power signal from the battery. When the cabinet interior temperature exceeds the desired temperature range, controller 76 sends signals to energize only relays C1 and C3 to actuate corresponding switches S1 and S3 in order to provide a 12 V DC signal power signal on terminal 13, while terminal 14 maintains a −12 V DC power signal since relay C2 is not energized. This voltage polarity or current flow direction causes the interior heat pump heat sinks to cool, thereby lowering the cabinet interior temperature.

In response to a cabinet interior temperature decreasing below the desired temperature range, controller 76 does not apply 5 V DC power signals to terminals 3 and 4, thereby maintaining switch S3 to provide a −12 V DC power signal on terminal 13. However, controller 76 does apply a 12 V DC power signal onto terminal 5 to enable heat pumps 54 to heat the cabinet interior. Specifically, terminal 5 is connected to relay C2, preferably a 12 V DC relay, manipulating corresponding switch S2 between contacts 84 and 86 wherein contact 84 is connected to terminal 9 and provides a 12 V DC power signal, while contact 86 is connected to terminal 10 and provides a −12 V DC power signal as described above for switch S3. Switch S2 is connected to terminal 14 supplying signals to control heat pumps 54, and is normally set to contract 86 to provide a −12 V DC power signal on terminal 14. When controller 76 desires to heat the cabinet interior, the controller places a 12 V DC power signal onto terminal 5, thereby energizing only relay C2. Switch S2 subsequently switches from contact 86 to contact 84 to provide a 12 V DC power signal onto terminal 14, while terminal 13 provides a −12 V DC power signal since relays C1 and C3 are not energized. Thus, a different voltage polarity (i.e., different current flow direction) is directed to heat pumps 54, thereby causing the interior heat pump heat sinks to dissipate heat and warm the cabinet interior. Therefore, by controlling signals on terminals 3, 4 and 5, controller 76 may control temperature within the cabinet interior based on temperature sensed by the temperature sensor.

Circuit board 59 containing the switching circuitry may be constructed in various ways. By way of example only, the components and wire are soldered on the top side of the board with screw terminals 9–16 soldered first followed by relays C1, C2 and C3. Subsequently, eight, approximately seven inch, eighteen gauge wire leads from terminals 1–8 are soldered to the board, and after all components are in place, excess wire is trimmed from the board bottom. Screw terminals 9–16 are subsequently marked, preferably via color markers. Faceplate 56 (FIG. 8) is typically painted on one side, wherein the circuit board is attached to the unpainted side of faceplate 56 via screws, stand offs and hex nuts with the head of the screws disposed on the painted side and the circuit board disposed between the stand off and hex nut. Controller 76 is installed into an opening defined in the painted side of the faceplate wherein an eight wire connector of the controller is connected to eight, approximately seven inch, eighteen gauge wires from the circuit board. Panel mount fuse holder 60 is inserted on the painted side of the faceplate, while fuse 62 is inserted into the holder. Further, power switch 58 is inserted into a corresponding opening on the painted side of the faceplate. A wire jumper is connected from terminal 9 to fuse holder 60 from the unpainted side of the faceplate using an approximate eight inch, eighteen gauge wire with a blue narrow quick disconnect or other quick disconnect device. A wire jumper is also connected from fuse holder 60 to power switch 58 using an approximate four inches, eighteen gauge wire with a blue narrow female quick disconnect and a blue wide female disconnect. Another blue wide female quick disconnect is connected to a center terminal of power switch 58 wherein the switching circuitry and circuit board for the controller assembly described above is formed.

Figure 11:
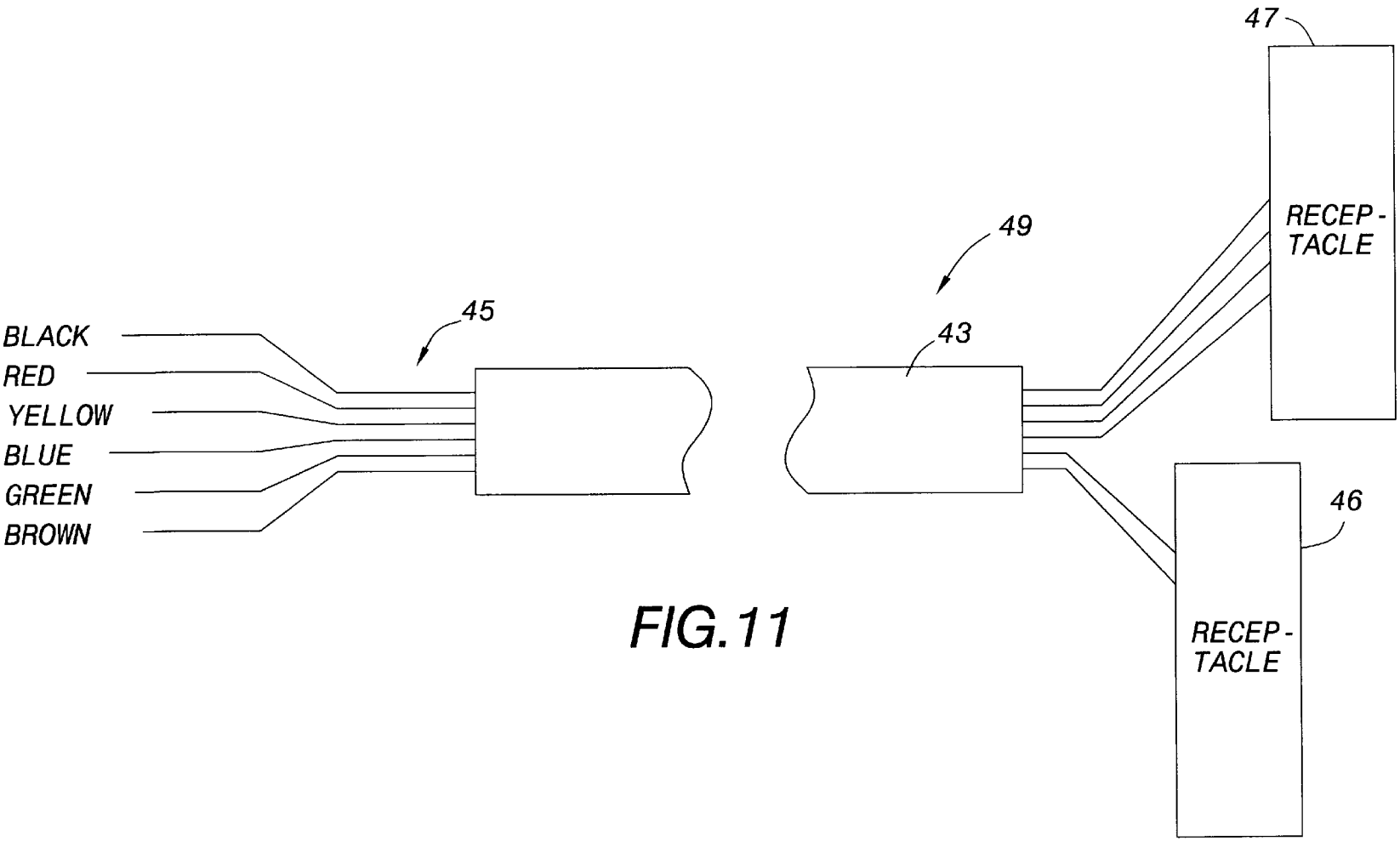
FIG. 11 is a schematic diagram of an exemplary wiring harness employed by the temperature control system of FIG. 2.

Wiring harness 49 for connecting heat pumps 54 to controller assembly 42 via wye harness 48 is illustrated in FIG. 11. Specifically, wiring harness 49 may be cut to a length of either approximately five or twenty-five feet, wherein the harness includes a sheath 43 covering a multicolored (e.g., black, red, yellow, blue, green and brown) six conductor wire 45. Sheath 43 is stripped approximately three inches at each wire end. One end of each wire is striped approximately one-quarter inch and tinned to create a uniform wire end. The other end of each wire includes a metal pin wherein a four position receptacle 47 of wiring harness 49 receives the respective ends of the black, red, yellow and blue wires, while the respective ends of the green and brown wires are inserted into a two position receptacle 46.

Figure 12:
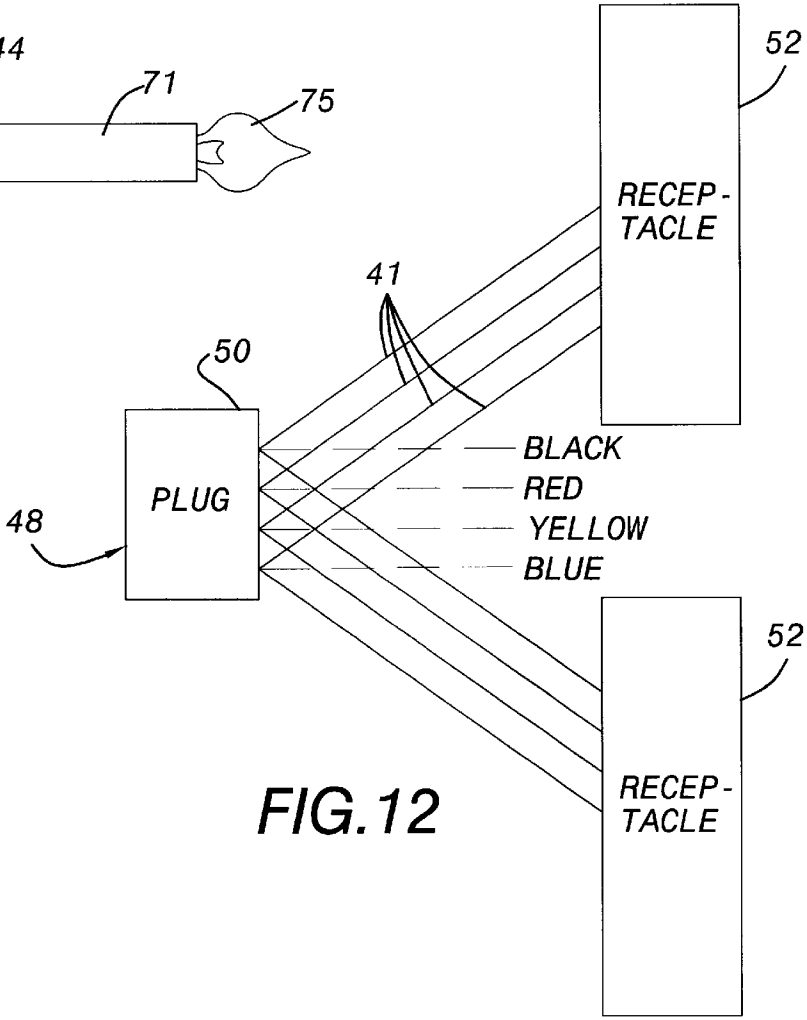
FIG. 12 is a schematic diagram of an exemplary wye harness employed by the temperature control system of FIG. 2.

Wye harness 48 for connecting controller assembly 42 to heat pumps 54 via wiring harness 49 is illustrated in FIG. 12. Specifically, wye harness 48 includes plug type connectors 50 and receptacle type connectors 52. The wye harness typically includes eight color coded wires 41, preferably two each of black, red, yellow and blue, that are separated into four pairs of the same color. The wires are connected in pairs at one end and attached to a four position plastic male plug 50. The remaining ends are separated into two four wire groups, each having a set of four different colors (i.e., black, red, yellow and blue) that are attached to respective four-position female receptacles 52. The color coded wires are typically stripped to approximately fourteen inches and are implemented by fourteen gauge wires stripped approximately one-half inch on one end and one-quarter inch on the other end. The one-half inch stripped ends of each wire pair are joined, crimped and soldered to a single metal pin, preferably male. Each one-quarter inch end is crimped and soldered to a single metal pin, preferably female. The male pins are inserted into connector 50, while the female pins are separated into two groups, each having different color wires as described above, and are inserted into respective connectors 52.

Figure 13:
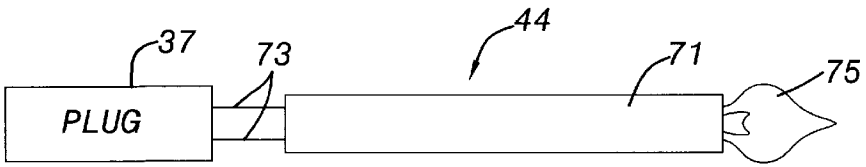
FIG. 13 is a side view in elevation and partial block diagram of a temperature sensor interfacing a plug type connector according to the present invention.

Temperature sensor 44 measures the cabinet interior temperature and is illustrated in FIG. 13. Specifically, temperature sensor 44 includes an RTD thermocouple, type sensor with two twenty gauge wires 73, each approximately thirtysix inches in length. Heat shrink tubing 71, preferably having approximate dimensions of one-eight inch by thirty-three inches, is utilized to protect the wires, wherein wires 73 are inserted through the tubing until the wires meet metal sensor 75. Wires 73 are then inserted one-eighth inch more and heated to provide a continuous sheath 71. A two position male plug 37, preferably plastic, attaches to wires 73 for connection to the controller assembly as described above. The wire ends are soldered to two pins, preferably male, that are inserted into male plug 37.

Figure 14:
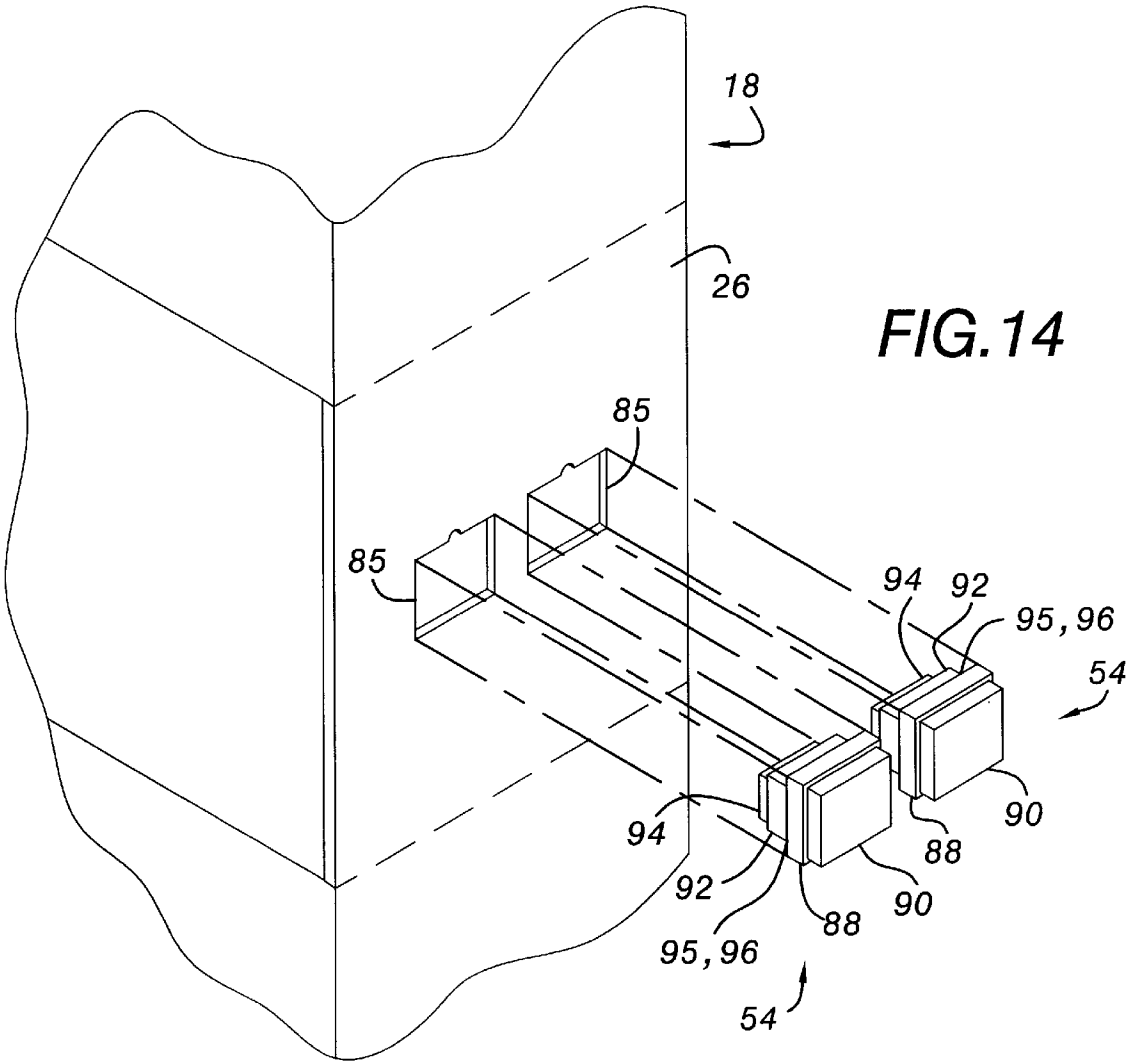
FIG. 14 is an exploded view in perspective of temperature control system heat pumps disposed within cabinet walls according to the present invention.
Figure 15A:
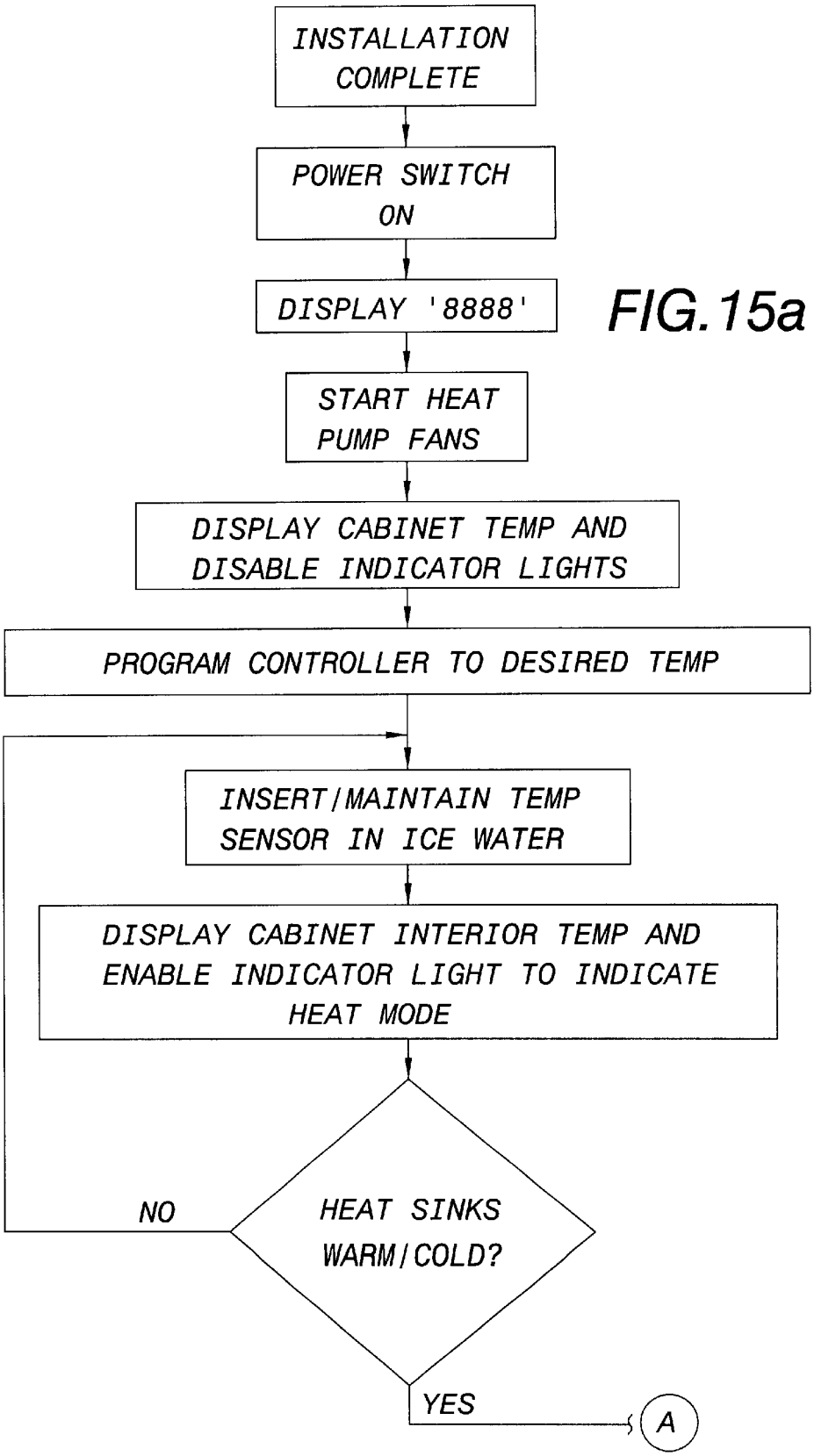
FIG. 15a, 15b are a procedural flow chart illustrating initial testing of a temperature control system according to the present invention.
Figure 15B:
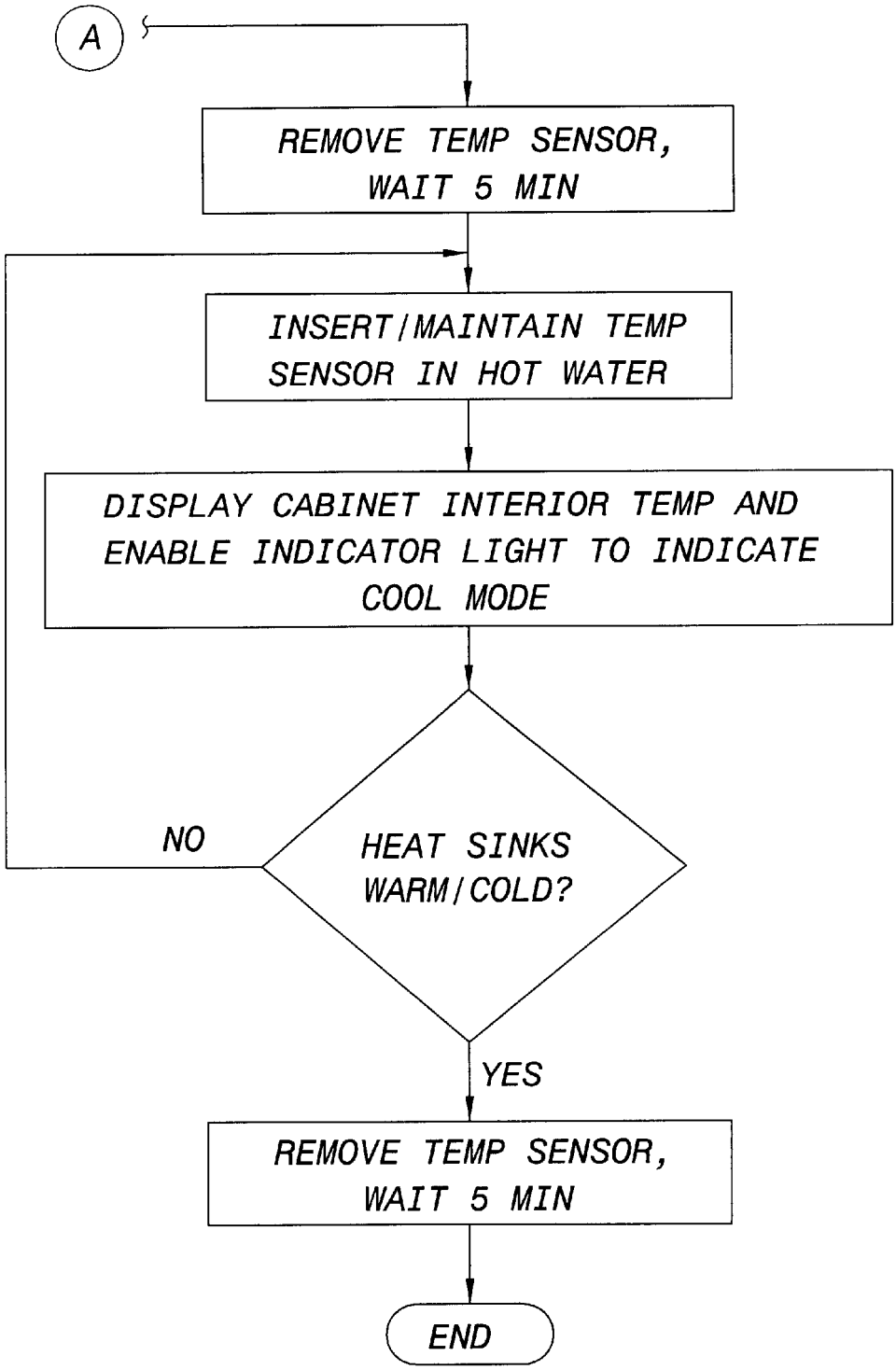
Figure 16A:
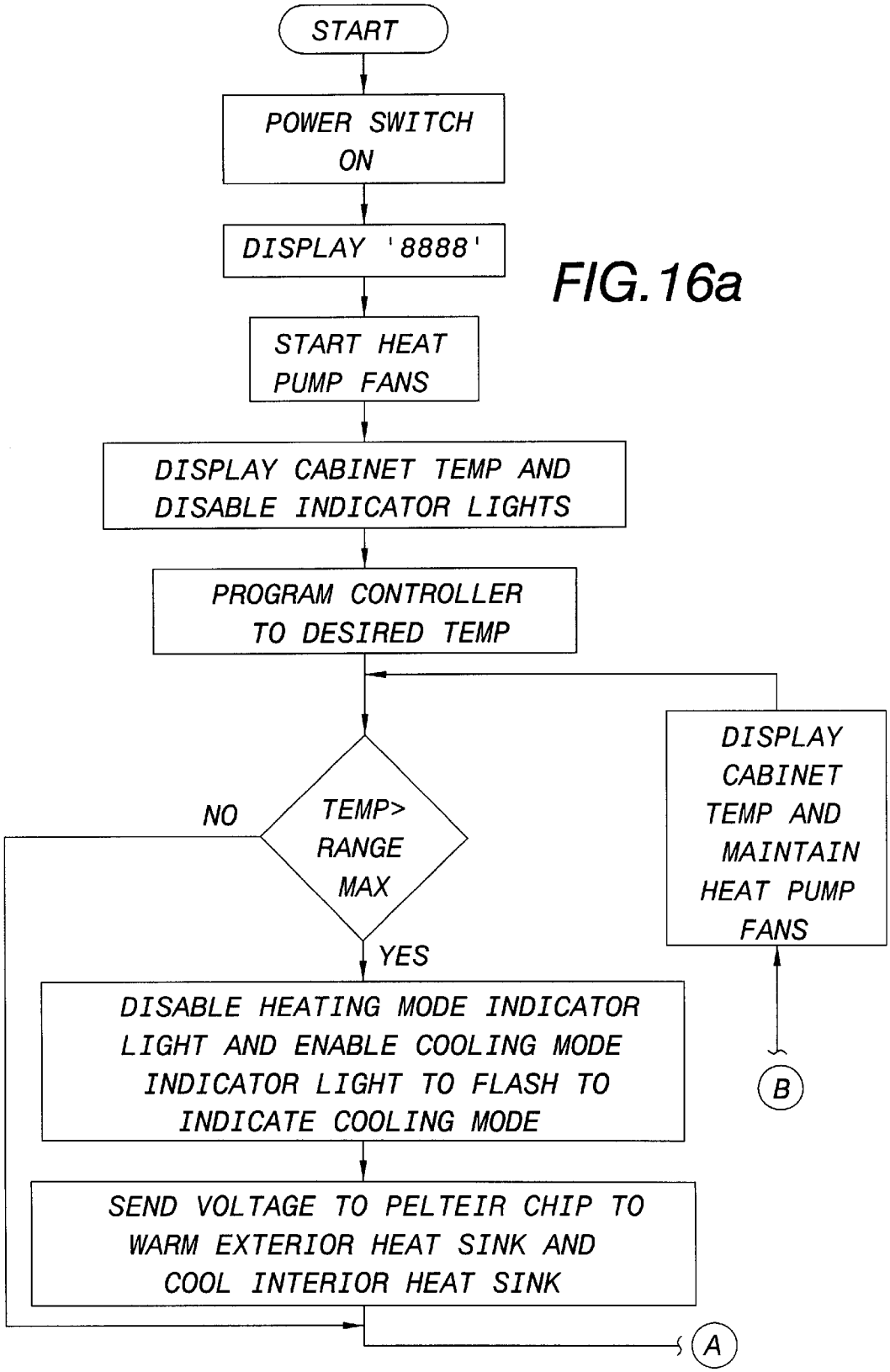
FIG. 16a, 16b are a procedural flow chart illustrating operation of a temperature control system according to the present invention.
Figure 16B:
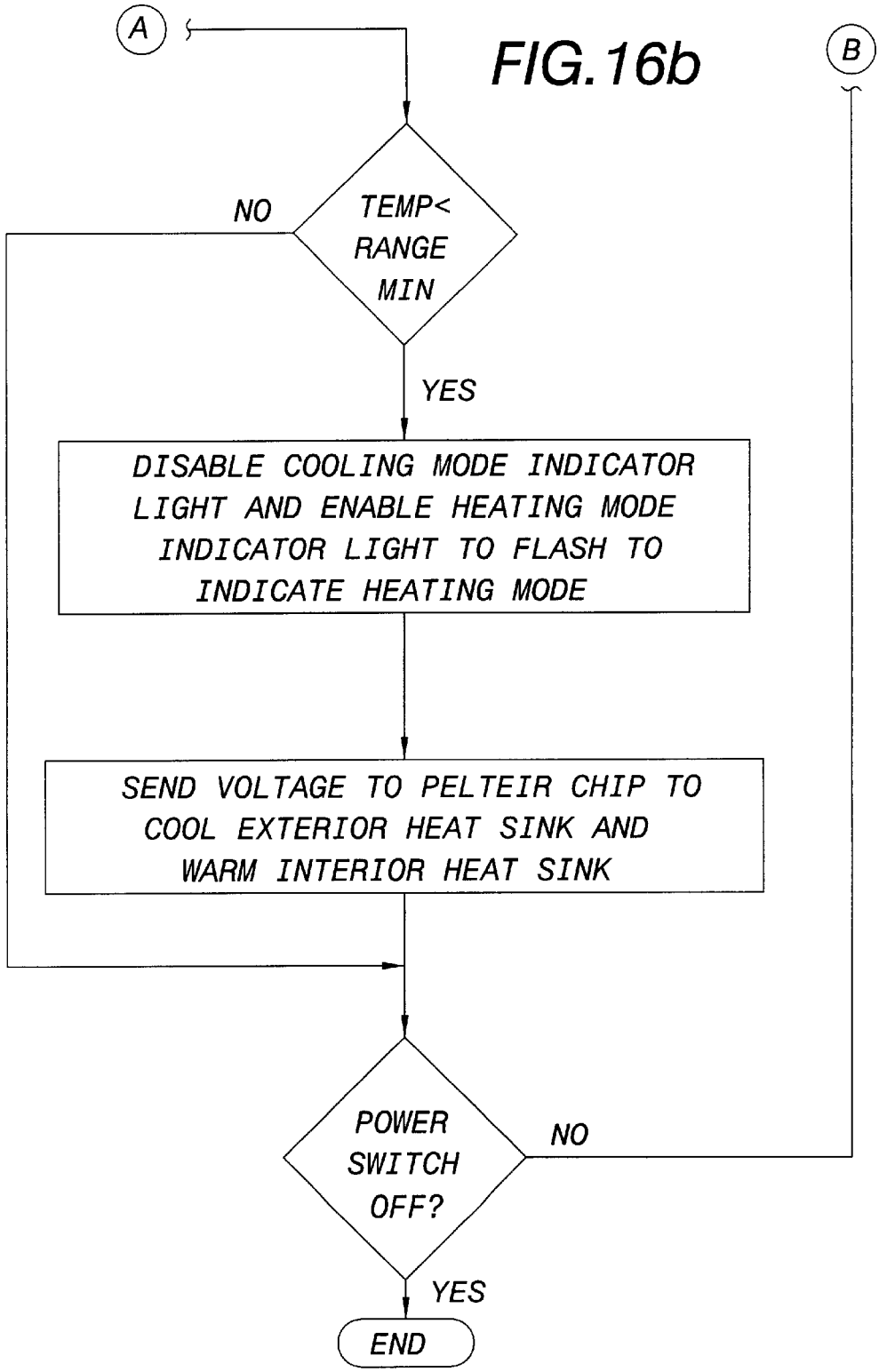

Installation of system 40 within a cabinet is illustrated in FIGS. 2, 14. Heat pumps 54 are typically installed within the cabinet in such a manner so as to avoid interference with head room or movement within the ambulance or other medical vehicle. Heat pumps 54 may be installed in empty spaces of the cabinet, however, a vent is required to allow air circulation around exterior heat sink 88 for heat transfer. The total area of the vent opening is approximately sixty inches per fan unit. Items within the cabinet are stored a sufficient distance from the heat pumps to ensure proper ventilation of each heat pump for operation of the temperature controlled cabinet system. In addition, the heat pumps may be oriented either vertically or horizontally depending upon air flow results achieved by each orientation. Exterior heat sink 88 is typically disposed external of the cabinet, while interior heat sink 92 is disposed within the cabinet interior. Openings 85 are preferably defined within a side wall 26 of cabinet 18 wherein the openings typically include dimensions approximately three and three-quarter inches by five inches. An approximate two inch clearance is required around all openings, walls, the cabinet top and bottom surfaces and between heat pumps 54. For thicker cabinet walls having a thickness of at least one-quarter inch, openings 85 are required to be chamfered at approximately three and three quarter inches to permit enhanced air flow. Controller assembly 42 may be installed up to ten feet away from heat pumps 54 when using an optional twenty-five foot wiring harness described above wherein the controller assembly is preferably disposed on an action wall, typically equipped in most ambulances and other vehicles, containing other accessory controls, switches and equipment that vary with ambulance manufacturer. The action wall is generally located opposite an ambulance curb side door or may be part of the front facia of the patient compartment. A cut out for the controller assembly typically has approximate dimensions of six inches (i.e., width) by four inches (i.e., height) wherein the controller protrudes seven inches in depth and requires a recess of at least eight inches for wire clearance. System installation initially requires that a system location (e.g., for the controller assembly and other system components) be determined with an EMS coordinator for the best location of storing drugs or I.V. solutions. When the depth required for the controller assembly is not deep enough, another location, preferably near the front of the bulkhead where other wiring is located, is selected. Interior finishes, such as shelves, brackets, panels and trim, are removed from the cabinet for installation of heat pumps, system wiring and the controller assembly. Subsequently, openings 85 and a cut out for the controller assembly are defined, while holes are defined in the cabinet in inconspicuous locations for the wiring harness. A system power wire extends from the battery disconnect switch to the controller assembly Cable routing is minimized such that kinks, bends, sharp edges and hot surfaces are avoided. The power wire is implemented by fourteen gauge SAE wire that is attached to 12 V electrical system (i.e., negative ground) to provide electrical requirements twenty-four hours a day. The wiring harness 49 is routed from openings 85 (i.e., heat pump locations within the cabinet) inside the cabinet through openings and recesses in the vehicle interior to the controller assembly wherein four position receptacle 47 and two position receptacle 46 for the temperature sensor remain within the cabinet interior. Insulation and perforated shelf mats are installed within the cabinet, while weather stripping material is disposed on doors when applicable. Heat pumps 54 are mounted in openings 85 via holes wihtin flanges 81 (FIG. 7) of exterior heat sink 88 such that the exterior heat sink resides on the cabinet exterior. Heat pumps 54 are connected to wye harness 48 via respective connectors 52. Connector 50 of the wye harness is connected to wiring harness female receptacle 47. Temperature sensor 44 is connected to connector 46 and is secured in the middle of the cabinet. The wiring harness is connected to color coded terminals 13–16 of controller assembly circuit board 59 (FIG. 9), while the positive portion of the power wire extending from the positive battery terminal is connected to power switch 58. The negative portion of the power wire extending from the negative battery terminal is connected to terminal 10 of circuit board 59. The wiring is typically secured with wire clamps and cable ties. After the connections are established, the controller assembly is installed at the determined location and the system is initially tested as described below. Once the system is tested, all interior finishes are placed back in the cabinet. System performance may degrade depending upon the environment in which the system is disposed. For example, when the system is installed in dusty environments, frequent inspection and cleaning of the heat sink fins is required since they may become dirty and clogged, thereby reducing heat pump efficiency. Further, heat transfer may be affected over time by corrosive conditions when the system is disposed within a salty environment wherein frequent inspection and cleaning may also be required. In addition, when ambient temperatures are not within factory specified operating conditions, unit efficiency is reduced, however, maintaining the vehicle within a vehicle bay may greatly reduce radiant heat gain and/or heat loss during winter and summer months of extreme temperatures.

Once the system has been installed into a cabinet, the system is initially started and tested as illustrated in FIGS. 2, 8 and 15a–15b. Initially, power switch 58 is actuated on control console 56 and '8888' is displayed momentarily on display 66, while the fans for heat pumps 54 are started and the display indicates the cabinet interior temperature with indicator lights 68, 69 disabled. A desired temperature is programmed into the system via buttons 70, 72 and 74. Specifically, temperature sensor 44 is placed within a cup of ice water or other cold arena. Heating mode indicator light 69, preferably green, disposed toward the top of display 66 flashes indicating that the system is in a heating mode, while display 66 displays the cabinet interior temperature. Temperature sensor 44 is maintained in the ice water until interior heat sink 92 disposed in the cabinet interior begins tow arm and exterior heat sink 88 disposed on the cabinet exterior begins to cool. After this occurs, temperature sensor 44 is removed from the ice water to permit its temperature to rise. Heat sinks 88 and 92 are permitted to equalize in temperature by waiting approximately five minutes. Subsequently, temperature sensor 44 is disposed in a cup of hot water (e.g., +45° C.). Cooling mode indicator light 68, preferably green, disposed toward the bottom of display 66 flashes indicating that the system is in a cooling mode, while display 66 displays the cabinet interior temperature. Temperature sensor 44 is maintained in the hot water until interior heat sink 92 disposed in the cabinet interior starts to cool and exterior heat sink 88 disposed on the cabinet exterior begins to warm. The temperature sensor is removed from the hot water and heat sinks 88,92 are permitted to equalize in temperature by waiting approximately five minutes prior to commencing operation. The initial start-up may be performed as described above in any order, and repeated any number of times. Further, any cold or heated environment may be utilized to stimulate the system via temperature sensor 44.

Operation of the temperature control system is described with reference to FIGS. 2–3, 8–10, and 16a–16b. Specifically, power to the system is initiated by actuating power switch 58 on the control panel assembly faceplate 56. Display 66 initially displays '8888' wherein heat pump fans 90, 94 are initiated with the display showing the cabinet interior temperature and indicator lights 68, 69 disabled. Fans 90, 94 operate continuously during system operation. Controller 76 is programmed to a desired temperature depending upon the items contained within the cabinet. For example, the controller is typically programmed to a set point of 21° C. with a dead band set point or variance of +50° C. for drug storage. Alternatively, the controller may be programmed to a set point of 35° C. with a dead band set point or variance of +5° C. for I.V. solution storage. Each set point may be programmed via buttons 70, 72, 74 wherein the set points include a one-half degree (0.5° C.) hysteresis. During normal or standby mode when the cabinet temperature resides within the desired range, display 66 shows the actual cabinet temperature, and fans 90, 94 are circulating air through the respective heat sinks 88, 92. Terminals 13 and 14 of circuit board 59 each contain negative voltage as described above to disable thermoelectric operation, while terminals 15 and 16 contain +12 V DC and 12 V DC, respectively, to provide power to and enable operation of the fans as described above.

In response to the temperature exceeding the desired temperature range, cooling mode indicator light 68 in the lower portion of the display flashes. Controller 76 places a 5 V power signal on terminals 3c and 4c, thereby actuating switches S1 and S3 to provide a 12 V DC power signal on terminal 13 of circuit board 59, while terminal 14 remains negative as described above. The forward bias of terminals 13 and 14 cause Peltier chip 96 to enable interior heat sink 92 to cool the cabinet interior as described above. Conversely, when the cabinet interior temperature falls below the desired temperature range, heating mode indicator light 69 disposed in the upper portion of the display flashes. Controller 76 places a 12 V DC power signal on terminal 5c to actuate switch S2 of switching circuitry 78, thereby providing a 12 V DC power signal on terminal 14 of circuit board 59, while terminal 13 remains negative as described above. The reverse bias of terminals 13 and 14 cause Peltier chip 96 to enable heat transfer from the exterior heat sink to the interior heat sink to heat the cabinet interior. This process continues as described above to maintain the cabinet temperature within the desired temperature range.

By way of example, system operation for storing drugs and 1.V. solution is described. Drugs are stored within the cabinet wherein the controller is programmed to a set point of 21° C. as described above. Temeprature sensor 44 inputs a converted signal to controller 76 representing the cabinet interior temperature. When the cabinet interior temperature is greater than or equal to 26.5° C. (i.e., 21° C. combined with 5° C. variance and 0.5° C. hysteresis), cooling mode indicator light 68 flashes, and controller 76 provides 5 V DC power signals as described above to enable heat pumps 54 to cool the cabinet interior. Controller 76 provides the 5 V DC power signals until the cabinet temperature is equal to or less than 25.5° C. (i.e., the largest temperature within the desired temperature range combined with hysteresis) wherein the 5 V DC power signals and cooling mode indicator light are disabled. Conversely, when the temperature signal indicates a cabinet temperature less than or equal to 20.5° C. (i.e., 21° C. combined with 0.5° C. hysteresis), heating mode indicator light 69 flashes and controller 76 provides a 12 V DC power signal as described above to enable heat pumps 54 to heat the cabinet interior. Controller 76 provides the 12 V DC power signal until the cabinet interior temperature is equal to or greater than 21.5° C. (i.e., the lowest temperature within the desired temperature range combined with hysteresis) wherein the 12 V DC power signal and heating mode indicator light 69 are disabled.

Similarly, I.V. solution may be stored in the cabinet with the controller programmed to a set point of 35° C. as described above. Temperature sensor 44 inputs a converted signal to controller 76 representing the cabinet interior temperature. When the cabinet interior temperature is greater than or equal to 40.5° C. (i.e., 35° C. combined with 5° C. variance and 0.5° C. Hysteresis), cooling mode indicator light 68 flashes and controller 76 provides 5 V DC power signals as described above to enable heat pumps 54 to cool the cabinet interior. Controller 76 provides the 5 V DC power signals until the cabinet interior temperature is equal to or less than 39.5° C. (i.e., the largest temperature within the desired temperature range combined with hysteresis) wherein the 5 V DC power signals and cooling mode indicator light are disabled. Conversely, when the temperature signal indicates a cabinet temperature less than or equal to 34.5° C. (i.e., 35° C. combined with 0.5° C. hysteresis), heating mode indicator light 69 flashes and controller 76 provides a 12 V DC power signal as described above to enable heat pumps 54 to heat the cabinet interior. Controller 76 provides the 12 V DC power signal until the cabinet temperature is equal to or greater than 35.5° C. (i.e., the lowest temperature within the desired temperature range combined with hysteresis) wherein the 12 V DC power signal and heating mode indicator light 69 are disabled.

Figure 17:
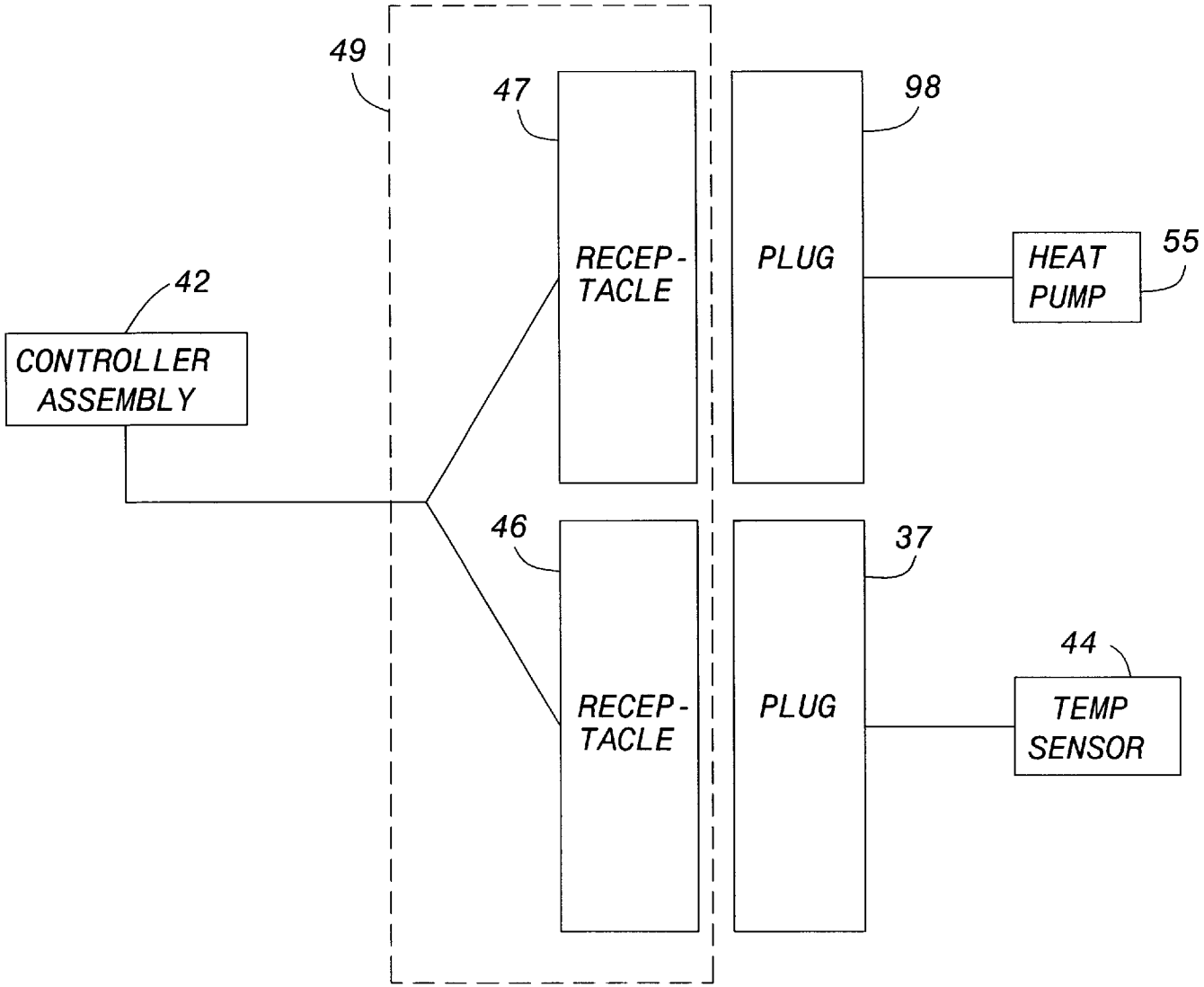
FIG. 17 is a block diagram of a temperature control system employing a single heat pump according to an alternative embodiment of the present invention.

Alternatively, temperature control system 40 may be implemented using a single large heat pump 55 is substantially the same manner described above as illustrated in FIG. 17. Specifically, system 40 includes controller assembly 42, temperature sensor 44 and wiring harness 49 as described above, and a heat pump 55 wherein the heat pump and temperature sensor are connected to the controller assembly via wiring harness 49 in substantially the same manner described above for the dual heat pump system. The system is substantially similar to, and functions in substantially the same manner as, the dual heat pump system described above except that a single heat pump is utilized and may be connected to the controller assembly with the wiring harness (i.e., the wye harness is not required).

Figure 18:
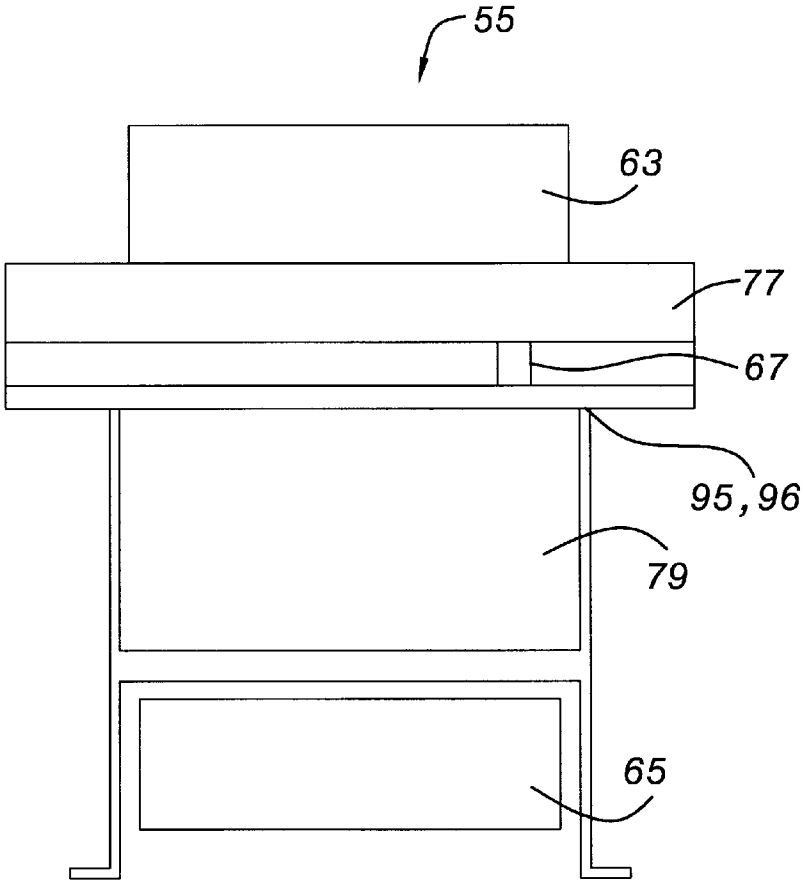
FIG. 18 is a side view in elevation of a heat pump employed by the control system of FIG. 17.

Heat pump 55 includes a configuration similar to that described above in FIG. 3 for the heat pumps 54 and is illustrated in FIG. 18. In particular, heat pump 55 includes an insulation layer 95 and Peltier chip 96 disposed between interior and exterior heat sinks 77, 79 wherein fans 63, 65 are disposed adjacent the respective heat sinks. The heat sinks of pump 55 are substantially similar to but have larger dimensions than the respective heat sinks of heat pumps 54 wherein the interior heat sink of heat pump 55 corresponds to the exterior heat sink of pumps 54 and is disposed on the cabinet interior, while the exterior heat sink of heat pump 55 corresponds to the interior heat sink of pump 54 and is disposed on the cabinet exterior. In other words, the alternative embodiment includes an interior heat sink that has larger dimensions than the exterior heat sink (i.e., the heat sinks of heat pump 54 are basically switched in the alternative embodiment). Heat pump 55 is prepared for installation by modifying an assembled heat pump, for example a model ST 3437 manufactured by Marlow Industries, Inc. of Dallas, Tex. A wire clamp (not shown) that holds fan wires for the heat pump is removed, wherein the hole defined in the heat pump for mounting the clamp is not utilized. Wires of fans 63, 65 are cut to approximately two inches after factor splice, stripped approximately one-half inch, and joined to similar wire colors (i.e., red to red and black to black). The joined wires are soldered to respective, approximately ten, inch fourteen gauge red and black wire leads using a butt technique. A red lead from Peltier chip 96 is soldered to an approximate ten inch, fourteen gauge blue lead, while a black lead from Peltier chip 96 is soldered to an approximate ten inch, fourteen gauge yellow lead. The soldered sections of the wires described above are protected by heat shrink tubing having approximate dimensions of one-eighth inch by two inches. The wires are collected and routed such that they reside adjacent the exterior heat sink. The soldered and protected section is further bounded by heat shrink tubing having approximate dimensions of three-eighths inches by six inches and is disposed proximate a wire chase 67 of interior heat sink 77. The wire clamp is reinstalled into a hole (not shown) within the interior heat sink via a screw and washer. The four color coded wires described above (i.e., red, black, blue and yellow) are stripped approximately one-quarter inch and a corresponding metal pin, preferably male, is attached to an end of each wire and inserted into a four position plastic male plug 98 (FIG. 17), substantially similar to the plug described above in relation to FIG. 3.

Figure 19:
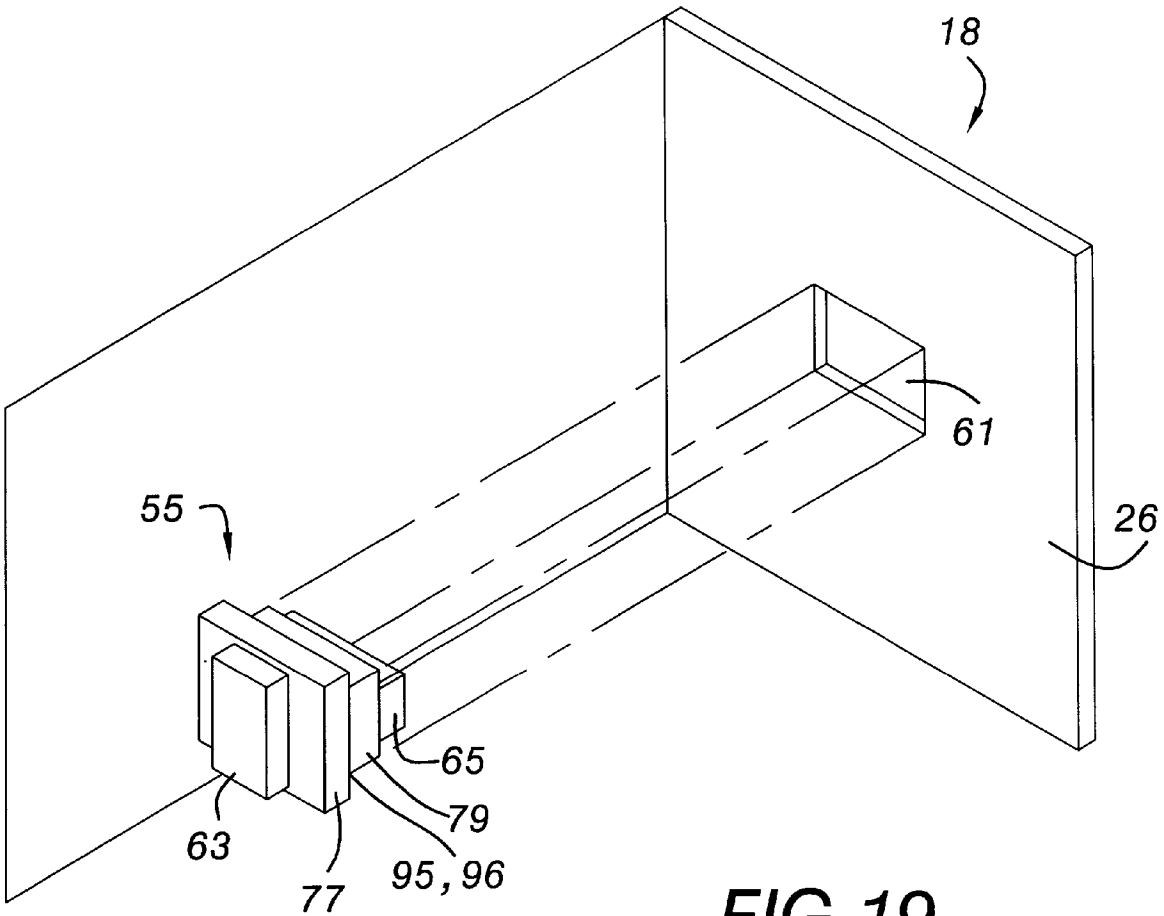
FIG. 19 is an exploded view in perspective of a temperature control system heat pump disposed within cabinet walls according to the alternative embodiment of the present invention.

Installation of system 40 with a single heat pump 55 within cabinet 18 is illustrated in FIG. 19. Specifically, system 40 and heat pump 55 are installed in cabinet side wall 26 in substantially the same manner described above for the system having heat pumps 54 except that the large interior hat sink is disposed within the cabinet interior, while the small exterior heat sink is disposed on the circuit exterior. An opening 61 for heat pump 55 within cabinet side wall 26 is required to have approximate dimensions of five and one-half inches by five and three-quarter inches in order to accommodate the heat pump. The orientation of the heat pump for better air flow is determined prior to constructing opening 61. Once heat pump 55 is installed within the cabinet side wall, it is connected to harness 49 via receptacle 47, while temperature sensor 44 is connected to receptacle 46 in substantially the same manner as described above except that the plug from heat pump 55 described above is directly connected to receptacle 47 since a wye harness is not required when utilizing a single heat pump. Wiring harness 49 is also connected to controller assembly circuit board 59 (FIG. 9) wherein receptacle 47 is connected to terminals 13–16, while receptacle 46 is connected to terminals 11–12 in a similar manner as described above. Once the heat pump is installed, the controller assembly is installed in an action wall or other suitable location within the vehicle as described above. Subsequent to installation, the system is initially tested and operated in substantially the same manner described above for FIGS. 15a, 15b and 16a, 16b.

It is to be understood that the temperature control system of the present invention may be placed in various cabinets or other storage structures, preferably having a maximum volume of approximately 6,000 cubic inches. The invention typically includes a preset temperature range of 21° C.–26° C. or 35° C.–40° C., however, any temperature or range may be programmed into the system to maintain the cabinet interior at a suitable temperature for storing various medical or other items.

It will be appreciated that the embodiments described above and illustrated in the drawings represent only a few of the many ways of implementing a controlled temperature cabinet system.

The cabinet may be any type of enclosed structure, preferably utilized in ambulances or other medical vehicles, and may include any quantity of various sized drawers, shelves or other storage arrangements wherein cabinets having shelves may include any number of doors opening in any direction. The wye and wiring harness may utilize any wiring capable of conveying signals, while the plug and receptacle type connectors may be implemented by any type of conventional connectors capable of establishing connections. The heat pumps may be implemented by any conventional or other heat pump type devices wherein the heat sinks may be implemented by any sufficiently thermally conductive material of any size capable of being mounted in a cabinet wall. The heat sinks may be of any shape and may include any quantity of fins wherein the fins may be of any shape and extend in any manner across any heat sink surface. The Peltier chip may be implemented by any circuitry or other thermoelectric or electromechanical devices having thermodynamic characteristics capable of transferring thermal energy between the heat sinks. The insulation layer may include any conventional insulation, such as foam. The fans may be implemented by any conventional fans or other devices capable of circulating air. The temperature sensor may be implemented by an RTD thermocouple or any other temperature sensor capable of providing temperature signals to the controller.

The control console may include any conventional switches or buttons for the power switch, and may include any conventional fuse holder and fuse to protect the circuit. The display may be on LED or LCD display, or any other mechanism for indicating temperature and the system mode. The indicator lights, display and console may be of any color, wherein the console may be constructed of metal or other suitable sturdy material. Further, the display may include any type of buttons or data entry devices to program the controller in any manner for a desired temperature. The controller may be implemented by conventional controllers, microprocessors or any other analog or digital circuitry capable of pressing the temperature signal and generating control signals for the heat pumps. The controller may be programmed to main the cabinet interior at any desired temperature, or within any desired temperature range having a desired hysteresis.

The switching circuitry may include any number of conventional or solid state switches (e.g., transistors, etc.) and relays, or other circuitry or components that are capable of supplying control signals to the heat pumps, arranged in any fashion to provide the proper signals to the heat pumps. The circuit board and circuitry may include any quantity of terminals and may be formed in any manner wherein the terminals may be soldered, screwed or be of other terminal types capable of receiving the wires. The terminals may be arranged and cooled in any manner to provide connections for single in any fashion capable of proper system operation.

The heat pumps may be installed at any location on the cabinet capable of heating and cooling the cabinet interior. Similarly, the controller assembly be installed at any appropriate location within the vehicle capable of operating the system. Further, any number of heat pumps, temperature sensors or other devices may be utilized by expanding the wye and wiring harness with additional connectors and/or wires to accommodate the additional components. The heat pumps may be installed within the cabinet at any orientation to provide enhanced air flow. Further, the heat sinks may be disposed within the heat pump at any orientation to enhance air flow and heat pump efficiency.

The system may be installed in new vehicle cabinets (e.g., new vehicles) as an option, or mounted in existing cabinets lacking temperature control capability. The system may be initially tested by placing the temperature sensor within sufficiently warm and cold environments and verifying proper heat pump operation as described above. The system may be factor set to various temperatures, however, any temperature may be programmed into the system as described above. The heat pumps may be assembled using any types of fasteners to secure components.

From the foregoing description it will be appreciated that the invention makes available a novel controlled temperature cabinet system and method wherein the system is installed within cabinets disposed in ambulances and other medical vehicles to maintain medical items stored in those cabinets at desired temperatures.

Having described preferred embodiments of a new and improved controlled temperature cabinet system and method, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A temperature control system for use in a cabinet disposed with an ambulance or other medical service vehicle, wherein the cabinet stores medical items and said system maintains the cabinet interior and medical items within a particular temperature range, said system comprising:

a temperature sensor disposed within the cabinet interior to measure the cabinet interior temperature and to generate a temperature signal indicating the measured cabinet interior temperature;

at least one heat pump partially disposed within the cabinet interior to heat or cool the cabinet interior; and a controller assembly to enable selection and entry of the particular temperature range into said system and to generate control signals to control each of said at least one heat pump, wherein said particular temperature range is selectable from anywhere within a larger range of temperatures attainable in the cabinet interior and said controller assembly controls each of said at least one heat pump to heat or cool the cabinet interior as required in response to comparison of the temperature signal received from said temperature sensor with the selected particular temperature range to maintain the cabinet interior within said selected particular temperature range, and wherein said controller assembly includes a control console including:

a numerical display unit for selectively displaying at least one temperature in said selected particular temperature range and said measured cabinet interior temperature indicated by said temperature signal, wherein said selected particular temperature range and said measured cabinet interior temperature are alternatively displayable on said numerical display unit.

2. The system of claim 1 wherein said system further includes:

a plurality of heat pumps wherein each said heat pump is partially disposed within the cabinet interior to heat or cool the cabinet interior;

a first wiring harness to connect each said heat pump and said temperature sensor to said controller assembly; and a second wiring harness to connect each said heat pump to said first wiring harness;

wherein said controller assembly controls each said heat pump to heat or cool the cabinet interior as required to maintain the selected particular temperature range within the cabinet interior in response to the comparison of the temperature signal received from said temperature sensor with the selected particular temperature range.

3. The system of claim 1 wherein said controller assembly further includes:

a controller to generate control signals to control each of said at least one heat pump to heat the cabinet interior when the comparison indicates that the measured cabinet interior temperature is below the selected particular temperature range, and to generate control signals to control each of said at least one heat pump to cool the cabinet interior when the comparison indicates that the measured cabinet interior temperature exceeds the selected particular temperature range.

4. The system of claim 1 further including a power connector to receive power for said temperature control system from an electrical system of the ambulance or other medical service vehicle.

5. The system of claim 1 wherein each of said at least one heat pump includes:

a first heat sink disposed within the cabinet interior to provide thermal energy to the cabinet interior;

a first fan disposed adjacent said first heat sink to circulate air about said first heat sink to transfer thermal energy from said first heat sink to the cabinet interior;

a second heat sink disposed on a cabinet exterior to provide thermal energy to a surrounding environment;

a second fan disposed adjacent said second heat sink to circulate air about said second heat sink to transfer thermal energy from said second heat sink to the surrounding environment, an insulating layer disposed between said first and second heat sinks; and a thermoelectric device disposed between said first and second heat sinks to transfer thermal energy between said first and second heat sinks in response to control signals received from said controller assembly.

6. The system of claim 5 wherein said thermoelectric device heats said first heat sink and cools said second heat sink in response to control signals of a first voltage polarity, and wherein said thermoelectric device cools said first heat sink and heats said second heat sink in response to control signals of a second voltage polarity.

7. The system of claim 5 wherein said thermoelectric device is a Peltier chip.

8. The system of claim 1 wherein said control console further includes:

a plurality of input devices for enabling entry of the selected particular temperature range into said temperature control system and facilitating alternative display of said selected particular temperature range and said measured cabinet interior temperature on said numerical display unit; and a power switch and fuse to enable power to said temperature control system; and said controller assembly further includes:

a controller for generating switching signals in response to the comparison of the temperature signal received from said temperature sensor with the selected particular temperature range; and a circuit board having switching circuitry to provide said control signals to each of said at least one heat pump in response to said switching signals.

9. The system of claim 8 wherein said circuit board includes a plurality of receiving terminals to receive switching and power signals, and a plurality of distribution terminals to distribute control and power signals, wherein said switching circuitry includes:

a first switch connected in series with a first contact receiving power signals from a receiving terminal;

a first relay connected to said receiving terminals to actuate said first switch in response to said switching signals;

a second switch connected between second and third contacts respectively receiving power signals of different polarities from said receiving terminals, wherein said second switch places a control signal of a particular polarity on a distribution terminal for distribution to each of said at least one heat pump;

a second relay connected in series with said first switch to actuate said second switch in response to actuation of said first switch;

a third switch connected between fourth and fifth contacts respectively receiving power signals of different polarities from said receiving terminals, wherein said third switch places a control signal of a particular polarity on a distribution terminal for distribution to each of said at least one heat pump; and a third relay connecting to a receiving terminal to actuate said third switch in response to said switching signals;

wherein said control signal provided by actuation of said first and second switches controls each of said at least one heat pump to cool the cabinet interior, and wherein said control signal provided by actuation of said third switch controls each of said at least one heat pump to heat the cabinet interior.

10. The system of claim 1 wherein said system includes one heat pump and further includes a first wiring harness to connect said one heat pump and said temperature sensor to said controller assembly, wherein said first wiring harness includes:

a plurality of color coded wires having first and second ends;

a sheath disposed about a substantial portion of said wires;

a first receptacle to receive respective second ends of a portion of said plurality of wires; and a second receptacle to receive respective second ends of a remaining portion of said plurality of wires;

wherein said first receptacle is connected to said one heat pump and said second receptacle is connected to said temperature sensor, and wherein respective first ends of said wires are connected to said controller assembly.

11. The system of claim 2 wherein said system includes two heat pumps, and said second wiring harness includes:

a plurality of color coded wires having first and second ends;

a first plug to receive respective first ends of said wires;

a first receptacle to receive respective second ends of a first half of said plurality of wires; and a second receptacle to receive respective second ends of a second half of said plurality of wires;

wherein said first plug is connected to said first wiring harness, and said first and second receptacles are respectively connected to corresponding heat pumps.

12. The system of claim 1 wherein:

each of said at least one heat pump is disposed within a wall of the cabinet;

said controller assembly is disposed in an interior wall of said ambulance or other medical service vehicle; and said system further includes a first wiring harness that extends from each of said at least one heat pump and said temperature sensor to said controller assembly to enable said controller assembly to receive the temperature signal and to send control signals to each of said at least one heat pump.

13. The system of claim 1 wherein the medical items include drugs and the selected particular temperature range is 21° C.–26° C.

14. The system of claim 1 wherein the medical items include intravenous solution and the selected particular temperature range is 35° C.–40° C.

15. A method for maintaining an interior of a cabinet disposed in an ambulance or other medical service vehicle within a particular temperature range via a temperature control system, wherein the cabinet stores medical items and said temperature control system includes a temperature sensor, a controller assembly to control system operation and at least one heat pump for heating or cooling the cabinet interior, said method comprising the steps of:

(a) selecting the particular temperature range for the medical items and entering that particular temperature range into said temperature control system, wherein said particular temperature range is selectable from anywhere within a larger range of temperatures attainable in the cabinet interior;

(b) selectively visibly displaying on a numerical display unit at least one temperature in said selected particular temperature range;

(c) with said temperature sensor, measuring the cabinet interior temperature and generating a temperature signal indicating the measured cabinet interior temperature;

(d) selectively visibly displaying on said numerical display unit said measured cabinet interior temperature indicated by said temperature signal, wherein said selected particular temperature range and said measured cabinet interior temperature are alternatively displayable on said numerical display unit;

(e) with said controller assembly, comparing the temperature signal received from said temperature sensor to the selected particular temperature range; and (f) controlling each of said at least one heat pump, via said controller assembly, to heat or cool the cabinet interior as required in response to said comparison of the temperature signal with the selected particular temperature range to maintain the cabinet interior temperature within said selected particular temperature range.

16. The method of claim 15 wherein step (f) further includes:

(f.1) in response to said comparison indicating that the measured cabinet interior temperature exceeds the selected particular temperature range, controlling each of said at least one heat pump, via said controller assembly, to cool the cabinet interior; and (f.2) in response to said comparison indicating that the measured cabinet interior temperature is below the selected particular temperature range, controlling each of said at least one heat pump, via said controller assembly, to heat the cabinet interior.

17. The method of claim 15 wherein step (a) further includes:

(a.1) powering said temperature control system with power from an electrical system of the ambulance or other medical service vehicle.

18. The method of claim 15 wherein each of said at least one heat pump includes a thermoelectric device to heat or cool that heat pump, and step (f) further includes:

(f.1) directing a first voltage polarity to each said thermoelectric device, via said controller assembly, to control each of said at least one heat pump to cool the cabinet interior in response to said comparison indicating that the measured cabinet interior temperature exceeds the selected particular temperature range; and (f.2) directing a second voltage polarity to each said thermoelectric device, via said controller assembly, to control each of said at least one heat pump to heat the cabinet interior in response to said comparison indicating that the measured cabinet interior temperature is below the selected particular temperature range.

19. The method of claim 18 wherein said thermoelectric device is a Peltier chip, and step (f.1) further includes:

(f.1.1) directing a first voltage polarity to each said Peltier chip, via said controller assembly, to control each of said at least one heat pump to cool the cabinet interior in response to said comparison indicating that the measured cabinet interior temperature exceeds the selected particular temperature range; and step (f.2) further includes:

(f.2.1) directing a second voltage polarity to each said Peltier chip, via said controller assembly, to control each of said at least one heat pump to heat the cabinet interior in response to said comparison indicating that the measured cabinet interior temperature is below the selected particular temperature range.

20. The method of claim 15 wherein said controller assembly includes a controller, a circuit board including switching circuitry and a control console including said numerical display unit and a plurality of input device, and wherein step (a) further includes:

(a.1) entering the selected particular temperature range into said temperature control system via said plurality of input devices;

step (d) further includes:

(d.1) selectively alternatively displaying the selected particular temperature range and the measured cabinet interior temperature on said numerical display unit in response to manipulation of said input devices;

step (e) further includes:

(e.1) comparing the temperature signal received from said temperature sensor to the selected particular temperature range via said controller and generating switching signals for said switching circuitry; and step (f) further includes:

(f.1) generating control signals for each of said at least one heat pump via said switching circuitry in response to the switching signals.

21. The method of claim 20 wherein said switching circuitry includes first, second and third relays that manipulate corresponding first, second and third switches, wherein said first switch provides a power signal to energize said second relay, said second switch provides a control signal to enable each of said at least one heat pump to cool the cabinet interior and said third switch provides a control signal to enable each of said at least one heat pump to heat the cabinet interior, and wherein step (f.1) further includes:

(f.1.1) energizing said first relay to actuate said first switch in response to the switching signals when the measured cabinet interior temperature exceeds the selected particular temperature range, wherein said first switch energizes said second relay and actuates said second switch to provide a control signal to control each of said at least one heat pump to cool the cabinet interior; and (f.1.2) energizing said third relay to actuate said third switch in response to the switching signals when the measured cabinet interior temperature is below the selected particular temperature range, wherein said third switch provides a control signal to control each of said at least one heat pump to heat the cabinet interior.

22. The method of claim 15 wherein step (a) further includes the steps of:

(a.1) disposing each of said at least one heat pump within a wall of the cabinet;

(a.2) disposing said temperature sensor within the cabinet interior;

(a.3) disposing said controller assembly in an interior wall of the ambulance or other medical service vehicle; and (a.4) connecting each of said at least one heat pump and said temperature sensor to the controller assembly via a wiring harness.

23. The method of claim 15 wherein the medical items include drugs, and step (a) further includes:

(a.1) selecting the particular temperature range of 21° C.–26° C.

24. The method of claim 15 wherein the medical items include intravenous solution, and step (a) further includes:

(a.1) selecting the particular temperature range of 35° C.–40° C.

25. A method for maintaining an interior of a cabinet disposed within an ambulance or other medical service vehicle within a particular temperature range via a temperature control system, wherein the cabinet stores medical items and said temperature control system includes a temperature sensor, a controller assembly to control system operation and at least one heat pump for heating or cooling the cabinet interior, said method comprising the steps of:

(a) retrofitting the temperature control system into a pre-existing cabinet permanently affixed in the ambulance or other medical service vehicle interior and lacking temperature control capability;

(b) selecting the particular temperature range for the medical items and entering that particular temperature range into said temperature control system;

(c) measuring the cabinet interior temperature via said temperature sensor disposed within the cabinet interior; and (d) controlling each of said at least one heat pump, via said controller assembly, to heat or cool the cabinet interior as required to maintain the cabinet interior within the selected particular temperature range, wherein said controller assembly controls each of said at least one heat pump in response to a comparison of the measured cabinet interior temperature with the selected particular temperature range.

26. The method of claim 25 wherein step (b) further includes:

(b.1) powering said temperature control system with power from an electrical system of the ambulance or other medical service vehicle to control each of said at least one heat pump in response to the measured cabinet interior temperature.

27. The method of claim 15 wherein said at least one heat pump consists of two heat pumps operable to heat and cool said cabinet interior, and wherein step (f) includes controlling said two heat pumps to maintain said cabinet interior temperature within said selected particular temperature range.

*28. A temperature control system for use in a cabinet mounted within a vehicle, wherein the cabinet stores items and said system maintains the cabinet interior and items within a particular temperature range, said system comprising:*

*a temperature sensor disposed within the cabinet interior to measure the cabinet interior temperature and to generate a temperature signal indicating the measured cabinet interior temperatures;*

*at least one thermal unit partially disposed within the cabinet interior to heat or cool the cabinet interior; and*

*a controller assembly to enable selection and entry of the particular temperature range into said system and to generate control signals to control each of said at least one thermal unit, wherein said particular temperature range is selectable from anywhere within a larger range of temperatures attainable in the cabinet interior and said controller assembly controls each of said at least one thermal unit to heat or cool the cabinet interior as required in response to a comparison of the temperature signal received from said temperature sensor with the selected particular temperature range to maintain the cabinet interior within said selected particular temperature range, and wherein said controller assembly includes a control console including:*

*a numerical display unit for selectively displaying at least one temperature in said selected particular temperature range and a current measured cabinet interior temperature indicated by said temperature signal, wherein said selected particular temperature range and said current measured cabinet interior temperature are alternatively displayable on said numerical display unit.*

*29. The system of claim 28 wherein said system further includes:*

*a plurality of thermal units wherein each said thermal unit is partially disposed within the cabinet interior to heat or cool the cabinet interior;*

*a first wiring harness to connect each said thermal unit and said temperature sensor to said controller assembly; and*

*a second wiring harness to connect each said terminal unit to said first wiring harness;*

*wherein said controller assembly controls each said thermal unit to heat or cool the cabinet interior as required to maintain the selected particular temperature range within the cabinet interior in response to the comparison of the temperature signal received from said temperature sensor with the selected particular temperature range.*

*30. The system of claim 28 wherein said controller assembly further includes:*

*a controller to generate control signals to control each of said at least one thermal unit to heat the cabinet interior when the comparison indicates that the measured cabinet interior temperature is below the selected particular temperature range, and to generate control signals to control each of said at least one thermal unit to cool the cabinet interior when the comparison indicates that the measured cabinet interior temperature exceeds the selected particular temperature range.*

*31. The system of claim 28 further including a power connector to receive power for said temperature control system from an electric system of said vehicle.*

*32. The system of claim 28 wherein each of said at least one thermal unit includes:*

*a first heat sink disposed within the cabinet interior to provide thermal energy to the cabinet interior;*

*a first fan disposed adjacent said first heat sink to circulate air about said first heat sink to transfer thermal energy from said first heat sink to the cabinet interior;*

*a second heat sink disposed on a cabinet exterior to provide thermal energy to a surrounding environment;*

*a second fan disposed adjacent said second heat sink to circulate air about said second heat sink to transfer thermal energy from said second heat sink to the surrounding environment;*

*an insulating layer disposed between said first and second heat sinks; and*

*a thermoelectric device disposed between said first and second heat sinks to transfer thermal energy between said first and second heat sinks in response to control signals received from said controls assembly.*

*33. The system of claim 32 wherein said thermoelectric device heat said first heat sink and cools said second heat sink in response to control signals of a first voltage polarity, and wherein said thermoelectric device cools said first heat sink and heats said second heat sink in response to control signals of a second voltage polarity.*

*34. The system of claim 32 wherein said thermoelectric device is a Peltier chip.*

*35. The system of claim 28 wherein said control console further includes:*

*a plurality of input devices for enabling entry of the selected particular temperature range into said temperature control system and facilitating alternatively display of said selected particular temperature range and said current measured cabinet interior temperature on said numerical display unit; and*

*a power switch and fuse to enable power to said temperature control system; and*

*said controller assembly further includes:*

*a controller for generating switching signals in response to the comparison of the temperature signal received from said temperature sensor with the selected particular temperature range; and*

*a circuit board having switching circuitry to provide said control signals to each of said at least one thermal unit in response to said switching signals.*

*36. The system of claim 35 wherein said circuit board includes a plurality of receiving terminals to receive switching and power signals, and a plurality of distribution terminals to distribute control and power signals, wherein said switching circuitry includes:*

*a first switch connected in series with a first contact receiving power signals from a receiving terminal;*

*a first relay connected to said receiving terminals to actuate said first switch in response to said switching signals;*

*a second switch connected between second and third contacts respectively receiving power signals of different polarities from said receiving terminals, wherein said second switch places a control signal of a particular polarity on a distribution terminal for distribution to each of said at least one thermal unit;*

*a second relay connected in series with said first switch to actuate said second switch in response to actuation of said first switch;*

*a third switch connected between fourth and fifth contacts respectively receiving power signals of different polarities from said receiving terminals, wherein said third switch places a control signal of a particular polarity on a distribution terminal for distribution to each of said at least one thermal unit; and*

*a third relay connected to a receiving terminal to actuate said third switch in response to said switching signals;*

*wherein said control signal provided by actuation of said first and second switches controls each of said at least one thermal unit to cool the cabinet interior, and wherein said control signal provided by actuation of said third switch controls each of said at least one thermal unit to heat the cabinet interior.*

*37. The system of claim 28, wherein said system includes one thermal unit and further includes a first wiring harness to connect said one thermal unit and said temperature sensor to said controller assembly, wherein said first wiring harness includes:*

*a plurality of color coded wires having first and second ends;*

*a sheath disposed about a substantial portion of said wires;*

*a first receptacle to receive respective second ends of a portion of said plurality of wires; and*

*a second receptacle to receive respective second ends of a remaining portion of said plurality of wires;*

*wherein said first receptacle is connected to said one thermal unit and said second receptacle is connected to said temperature sensor, and wherein respective first ends of said wires are connected to said controller assembly.*

*38. The system of claim 29 wherein said system includes two thermal units, and said second wiring harness includes:*

*a plurality of color coded wires having first and second ends;*

*a first plug to receive respective first ends of said wires;*

*a first receptacle to receive respective second ends of a first half of said plurality of wires; and*

*a second receptacle to receive respective second ends of a second half of said plurality of wires;*

*wherein said first plug is connected to said first wiring harness, and said first and second receptacles are respectively connected to corresponding thermal units.*

*39. The system of claim 28 wherein:*

*each of said at least one thermal unit is disposed within a wall of the cabinet;*

*said controller assembly is disposed on a support structure; and*

*said system further includes a first wiring harness that extends from each of said at least one thermal unit and said temperature sensor to said controller assembly to enable said controller assembly to receive the temperature signal and to send control signals to each of said at least one thermal unit.*

*40. The system of claim 28 wherein the items include drugs and the selected particular temperature range is 21° C.–26° C.*

*41. The system of claim 28 wherein the items include intravenous solution and the selected particular temperature range is 35° C.–40° C.*

*42. A method for maintaining an interior of a cabinet mounted in a vehicle within a particular temperature range via a temperature control system, wherein the cabinet stores items and said temperature control system includes a temperature sensor, a controller assembly to control system operation and at least one thermal unit for heating or cooling the cabinet interior, said method comprising the steps of:*

*(a) selecting the particular temperature range for the items and entering that particular temperature range into said temperature control system, wherein said particular temperature range is selectable from anywhere within a larger range of temperatures attainable in the cabinet interior;*

*(b) selectively visibly displaying on a numerical display unit at least one temperature in said selected particular temperature range;*

*(c) with said temperature sensor, measuring the cabinet interior temperature and generating a temperature signal indicating the measured cabinet interior temperature;*

*(d) selectively visibly displaying on said numerical display unit a current measured cabinet interior temperature indicated by said temperature signal, wherein said selected particular temperature range and said current measured cabinet interior temperature are alternatively displayable on said numerical display unit;*

*(e) with said controller assembly, comparing the temperature signal received from said temperature sensor to the selected particular temperature range; and*

*(f) controlling each of said at least one thermal unit, via said controller assembly, to heat or cool the cabinet interior as required in response to said comparison of the temperature signal with the selected particular temperature range to maintain the cabinet interior temperature within said selected particular temperature range.*

*43. The method of claim 42 wherein step (f) further includes:*

*(f.1) in response to said comparison indicating that the measured cabinet interior temperature exceeds the selected particular temperature range, controlling each of said at least one thermal unit, via said controller assembly, to cool the cabinet interior; and*

*(f.2) in response to said comparison indicating that the measured cabinet interior temperature is below the selected particular temperature range, controlling each of said at least one thermal unit, via said controller assembly, to heat the cabinet interior.*

*44. The method of claim 42 wherein step (a) further includes:*

*(a.1) powering said temperature control system with power from an electrical system of said vehicle.*

*45. The method of claim 42 wherein each of said at least one thermal unit includes a thermoelectric device to heat or cool that thermal unit, and step (f) further includes:*

*(f.1) directing a first voltage polarity to each said thermoelectric device, via said controller assembly, to*

*control each of said at least one thermal unit to cool the cabinet interior in response to said comparison indicating that the measured cabinet interior temperature exceeds the selected particular temperature range; and*

*(f.2) directing a second voltage polarity to each said thermoelectric device, via said controller assembly, to control each of said at least one thermal unit to heat the cabinet interior in response to said comparison indicating that the measured cabinet interior temperature is below the selected particular temperature.*

*46. The method of claim 45 wherein said thermoelectric device is a Peltier chip, and step (f.1) further includes:*

*(f.1.1) directing a first voltage polarity to each said Peltier chip, via said controller assembly, to control each of said at least one thermal unit to cool the cabinet interior in response to said comparison indicating that the measured cabinet interior temperature exceeds the selected particular temperature range; and*

*step (f.2) further includes:*

*(f.2.1) directing a second voltage polarity to each said Peltier chip, via said controller assembly, to control each of said at least one thermal unit to heat the cabinet interior in response to said comparison indicating that the measured cabinet interior temperature is below the selected particular temperature range.*

*47. The method of claim 42 wherein said controller assembly includes a controller, a circuit board including switching circuitry and a control console including said numerical display unit and a plurality of input devices, and wherein step (a) further includes:*

*(a.1) entering the selected particular temperature range into said temperature control system via said plurality of input devices;*

*step (d) further includes:*

*(d.1) selectively alternatively displaying the selected particular temperature range and the current measured cabinet interior temperature on said numerical display unit in response to manipulation of said input devices;*

*step (e) further includes:*

*(e.1) comparing the temperature signal received from said temperature sensor to the selected particular temperature range via said controller and generating switching signals for said switching circuitry; and*

*step (f) further includes:*

*(f.1) generating control signals for each of said at least one thermal unit via said switching circuitry in response to the switching signals.*

*48. The method of claim 47 wherein said switching circuitry includes first, second and third relays that manipulate corresponding first, second and third switches, wherein said first switch provides a power signal to energize said second relay, said second switch provides a control signal to enable each of said at least one thermal unit to cool the cabinet interior and said third switch provides a control signal to enable each of said at least one thermal unit to heat the cabinet interior, and wherein step (f.1) further includes:*

*(f.1.1) energizing said first relay to actuate said first switch in response to the switching signals when the measured cabinet interior temperature exceeds the selected particular temperature range, wherein said first switch energizes said second relay and actuates said second switch to provide a control signal to control each of said at least one thermal unit to cool the cabinet interior; and*

*(f.1.2) energizing said third relay to actuate said third switch in response to the switching signals when the measured cabinet interior temperature is below the selected particular temperature range, wherein said third switch provides a control signal to control each of said at least one thermal unit to heat the cabinet interior.*

*49. The method of claim 42 wherein step (a) further includes the steps of:*

*(a.1) disposing each of said at least one heat pump within a wall of the cabinet;*

*(a.2) disposing said temperature sensor within the cabinet interior;*

*(a.3) disposing said controller assembly on a support structure; and*

*(a.4) connecting each of said at least one thermal unit and said temperature sensor to the controller assembly via a wiring harness.*

*50. The method of claim 42 wherein the items include drugs, and step (a) further includes:*

*(a.1) selecting the particular temperature range of 21° C.–26° C.*

*51. The method of claim 42 wherein the items include intravenous solution, and step (a) further includes:*

*(a.1) selecting the particular temperature range of 35° C.–40° C.*

*52. The method of claim 42 wherein said at least one thermal unit includes two thermal units operable to heat and cool said cabinet interior, and wherein step (f) includes controlling said two thermal units to maintain said cabinet interior temperature within said selected particular temperature range.*

*53. A method for enabling a cabinet lacking temperature control capability to control a cabinet interior temperature to reside within a particular temperature range, wherein the cabinet stores items and a cabinet temperature system includes a temperature sensor, an operation assembly to oversee system operation and at least one thermal unit for heating or cooling the cabinet interior, said method comprising the steps of:*

*(a) converting a cabinet currently in use for storing items and lacking temperature control capability into a temperature controlled cabinet system by installing the cabinet temperature system into the cabinet and disposing the temperature sensor within the cabinet interior;*

*(b) facilitating entry of the particular temperature range for the items into said cabinet temperature system;*

*(c) ascertaining the cabinet interior temperature via a temperature measurement performed by said temperature sensor disposed within the cabinet interior; and*

*(d) controlling each of said at least one thermal unit, via said operation assembly, to heat or cool the cabinet interior as required to control the cabinet interior temperature to reside within the selected particular temperature range, wherein said operation assembly controls each of said at least one thermal unit in response to a comparison of the measured cabinet interior temperature with the selected particular temperature range.*

*54. The method of claim 53 wherein step (b) further includes:*

*(b.1) powering said cabinet temperature system with power from an electric system of a vehicle.*

*55. A temperature control system for use in a storage area lacking temperature control capability and disposed within a vehicle, wherein the storage area stores items and said*

*system maintains the storage area and items within a particular temperature range, said system comprising:*

*a temperature sensor retrofit within the storage area to measure the storage area interior temperature and to generate a temperature signal indicating the measured temperature;*

*at least one thermal unit retrofit within the storage area to heat or cool the storage area interior; and*

*a controller assembly retrofit within said vehicle to enable entry of a selected particular temperature range into said system and to generate control signals to control each of said at least one thermal unit, wherein said controller assembly controls each of said at least one thermal unit to heat or cool the storage area as required in response to a comparison of the temperature signal received from said temperature sensor with the selected particular temperature range to maintain the storage area interior within said selected particular temperature range.*

*56. The system of claim 55 wherein said each thermal unit includes a heat pump.*

*57. The system of claim 55 wherein said controller assembly further includes:*

*a controller to generate control signals to control each of said at least one thermal unit to heat the storage area interior when the comparison indicates that the measured temperature is below the selected particular temperature range, and to generate control signals to control each of said at least one thermal unit to cool the storage area interior when the comparison indicates that the measured temperature exceeds the selected particular temperature range.*

*58. The system of claim 55 further including a power connector to receive power for said temperature control system from an electrical system of the vehicle.*

*59. The system of claim 55 wherein:*

*said storage area is enclosed by a plurality of walls;*

*each of said at least one thermal unit is disposed within a wall of the enclosed storage area;*

*said controller assembly is disposed on a support structure within said vehicle; and*

*said system further includes a wiring harness that extends from each of said at least one thermal unit and said temperature sensor to said controller assembly to enable said controller assembly to receive the temperature signal and to seal control signals to each of said at least one thermal unit.*

*60. The system of claim 55 wherein the items include drugs and the selected particular temperature range is 21° C–26° C.*

*61. The system of claim 55 wherein the items include intravenous solution and the selected particular temperature range is 35° C.–40° C.*

*62. A method for enabling a storage area lacking temperature control capability and disposed within a vehicle to control a storage area interior temperature to reside within a particular temperature range, wherein the storage area stores items and a temperature control system includes a temperature sensor, an operation assembly to oversee system operation and at least one thermal unit to heat or cool the storage area interior, said method comprising the steps of:*

*(a) retrofitting the temperature control system into the vehicle storage area and disposing the temperature sensor within the storage area interior;*

*(b) facilitating entry of a selected particular temperature range for the items into said temperature control system;*

*(c) ascertaining the storage area interior temperature via a temperature measurement performed by said temperature sensor disposed within the storage area interior; and*

*(d) controlling each of said at least one thermal unit, via said operation assembly, to heat or cool the storage area interior as required to control the storage area interior temperature to reside within the selected particular temperature range, wherein said operation assembly controls each of said at least one thermal unit in response to a comparison of the measured temperature with the selected particular temperature range.*

*63. The method of claim 62 wherein said each thermal unit includes a heat pump, and step (d) further includes:*

*(d.1) controlling each of said at least one heat pump, via said operation assembly, to heat or cool the storage area interior as required to control the storage area interior temperature to reside within the selected particular temperature range, wherein said operation assembly controls each of said at least one heat pump in response to a comparison of the measured temperature with the selected particular temperature range.*

*64. The method of claim 62 wherein step (d) further includes:*

*(d.1) in response to said comparison indicating that the measured temperature exceeds the selected particular temperature range, controlling each of said at least one thermal unit, via said operation assembly, to cool the storage area interior; and*

*(f.2) in response to said comparison indicating that the measured temperature is below the selected particular temperature range, controlling each of said at least one thermal unit, via said operation assembly, to heat the storage area interior.*

*65. The method of claim 62 wherein step (a) further includes:*

*(a.1) powering said temperature control system with power from an electrical system of the vehicle.*

*66. The method of claim 62 wherein said storage area is enclosed by a plurality of walls, and step (a) further includes:*

*(a.1) disposing each of said at least one thermal unit within a wall of the storage area;*

*(a.2) disposing said operation assembly on a support structure within said vehicle; and*

*(a.3) connecting each of said at least one thermal unit and said temperature sensor to the operation assembly.*

*67. The method of claim 62 wherein the items include drugs, and step (a) further includes:*

*(a.1) selecting the particular temperature range of 21° C.–26° C.*

*68. The method of claim 62 wherein the items include intravenous solution, and step (a) further includes:*

*(a.1) selecting the particular temperature range of 35° C.–40° C.*

*69. The system of claim 28, wherein said at least one thermal unit includes at least one heat pump.*

*70. The method of claim 42, wherein said at least one thermal unit includes at least one heat pump.*

*71. The method of claim 53, wherein said at least one thermal unit includes at least one heat pump.*

* * * * *

UNITED STATES PATENT AND TRADEMARK OFFICE

CERTIFICATE OF CORRECTION

PATENT NO. : RE 39,287 E 
APPLICATION NO. : 09/908488
DATED : September 19, 2006
INVENTOR(S) : Bishop, II It is certified that error appears in the above-identified patent and that said Letters Patent is hereby corrected as shown below:

Col. 19, line 35, change “disposed with” to --disposed within--.

Col. 19, line 54, change “in response to comparison” to --in response to a comparison--.

Col. 21, line 38, change “connecting” to --connected--.

Col. 23, line 48, change “plurality of input device” to --plurality of input devices--.

Col. 25, line 25, change “temperatures” to --temperature--.

Col. 25, line 59, change “terminal” to --thermal--.

Col. 26, line 14, change “electric” to --electrical--.

Col. 26, line 34, change “controls assembly” to --control assembly--.

Col. 26, line 36, change “device heat” to --device heats--.

Col. 26, line 47, change “alternatively” to --alternative--.

Col. 29, line 10, change “temperature” to --temperature range--.

Col. 30, line 8, change “heat pump” to --thermal unit--.

Col. 30, line 64, change “electric” to --electrical--.

UNITED STATES PATENT AND TRADEMARK OFFICE

CERTIFICATE OF CORRECTION

PATENT NO. : RE 39,287 E
APPLICATION NO. : 09/908488
DATED : September 19, 2006
INVENTOR(S) : Bishop, II It is certified that error appears in the above-identified patent and that said Letters Patent is hereby corrected as shown below:

Col. 31, line 45, change “seal control signals” to --send control signals--.

Signed and Sealed this

Thirtieth Day of January, 2007

JON W. DUDAS
*Director of the United States Patent and Trademark Office*